(12) United States Patent
Lee et al.

(10) Patent No.: US 12,126,074 B2
(45) Date of Patent: Oct. 22, 2024

(54) ELECTRONIC DEVICE INCLUDING ANTENNA

(71) Applicant: Samsung Electronics Co., Ltd., Gyeonggi-do (KR)

(72) Inventors: Jong Hyuck Lee, Gyeonggi-do (KR); Hae Yeon Kim, Gyeonggi-do (KR); Se Hyun Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/517,123

(22) Filed: Nov. 22, 2023

(65) Prior Publication Data

US 2024/0222848 A1    Jul. 4, 2024

Related U.S. Application Data

(63) Continuation of application No. 16/320,169, filed on Jan. 24, 2019, now Pat. No. 11,831,068, which is a (Continued)

(30) Foreign Application Priority Data

Jul. 29, 2016 (KR) ........................ 10-2016-0096566

(51) Int. Cl.
*H01Q 1/24* (2006.01)
*H01Q 5/321* (2015.01)
(Continued)

(52) U.S. Cl.
CPC ............. *H01Q 1/243* (2013.01); *H01Q 5/321* (2015.01); *H01Q 5/335* (2015.01); *H01Q 5/50* (2015.01); *H01Q 9/42* (2013.01)

(58) Field of Classification Search
CPC ........ H01Q 1/243; H01Q 5/321; H01Q 5/335; H01Q 5/50; H01Q 9/42
See application file for complete search history.

(56) References Cited

U.S. PATENT DOCUMENTS 7,808,433 B2   10/2010   Rutfors et al.
8,564,439 B2   10/2013   Deavours et al.
(Continued)

FOREIGN PATENT DOCUMENTS

CN   202111228 U   1/2012
CN   103346397 A   10/2013
(Continued)

OTHER PUBLICATIONS

Indian Hearing Notice dated Feb. 8, 2024.
Chinese Search Report dated Jul. 22, 2020.
European Search Report dated Jun. 13, 2019.

*Primary Examiner* — Graham P Smith
(74) *Attorney, Agent, or Firm* — Cha & Reiter, LLC

(57) ABSTRACT

Disclosed is an electronic device. The electronic device according to an embodiment includes an antenna element including at least a portion of a housing of the electronic device and configured to resonate in a first frequency band, a conductive plate electrically connected with the antenna element, positioned within the housing, and configured to resonate in the first frequency band or in a second frequency band higher than the first frequency band, a filter circuit electrically connected with the conductive plate and having a pass band in the second frequency band, and a conductive member electrically connected with the conductive plate through the filter circuit and configured to resonate in the second frequency band. Moreover, various embodiment found through the disclosure are possible.

6 Claims, 22 Drawing Sheets

Related U.S. Application Data continuation of application No. PCT/KR2017/005454, filed on May 25, 2017.

(51) Int. Cl.
  *H01Q 5/335* (2015.01)
  *H01Q 5/50* (2015.01)
  *H01Q 9/42* (2006.01)

(56) References Cited

U.S. PATENT DOCUMENTS

| | | | |
|---|---|---|---|
| 8,970,378 B2 | 3/2015 | Deavours et al. | |
| 9,583,825 B2 | 2/2017 | Jung | |
| 10,116,039 B2 | 10/2018 | Lee et al. | |
| 2008/0246674 A1 | 10/2008 | Rutfors et al. | |
| 2011/0291836 A1 | 12/2011 | Deavours et al. | |
| 2012/0256800 A1 | 10/2012 | Kuonanoja | |
| 2013/0214979 A1 | 8/2013 | McMilin et al. | |
| 2014/0008447 A1 | 1/2014 | Deavours et al. | |
| 2015/0042528 A1 | 2/2015 | Jung | |
| 2015/0154490 A1 | 6/2015 | Deavours et al. | |
| 2015/0214626 A1 | 7/2015 | Liu et al. | |
| 2016/0056530 A1 | 2/2016 | Lee et al. | |
| 2016/0064820 A1 | 3/2016 | Kim et al. | |

FOREIGN PATENT DOCUMENTS

| | | |
|---|---|---|
| CN | 103515696 A | 1/2014 |
| CN | 204088565 U | 1/2015 |
| CN | 104810621 A | 7/2015 |
| CN | 104882664 A | 9/2015 |
| KR | 10-2007-0052292 A | 5/2007 |
| KR | 10-2014-0123578 A | 10/2014 |
| KR | 10-2015-0017179 A | 2/2015 |
| KR | 10-2015-0118481 A | 10/2015 |
| KR | 10-2016-0022074 A | 2/2016 |
| WO | 2015/127830 A1 | 9/2015 |

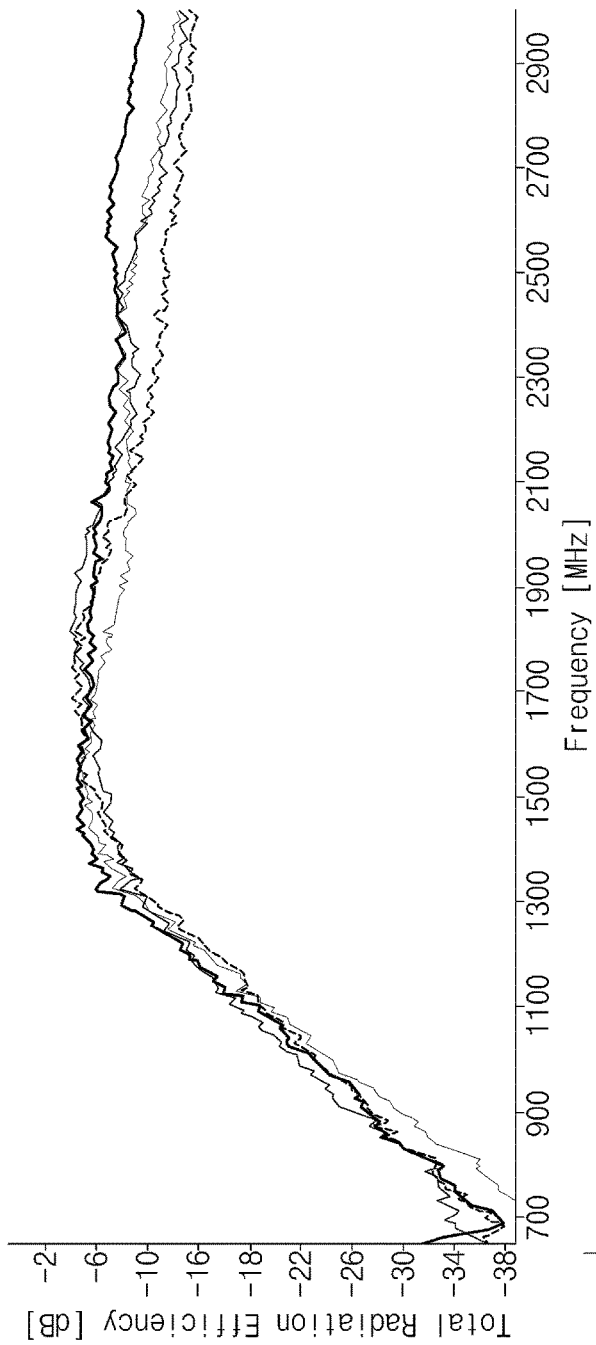
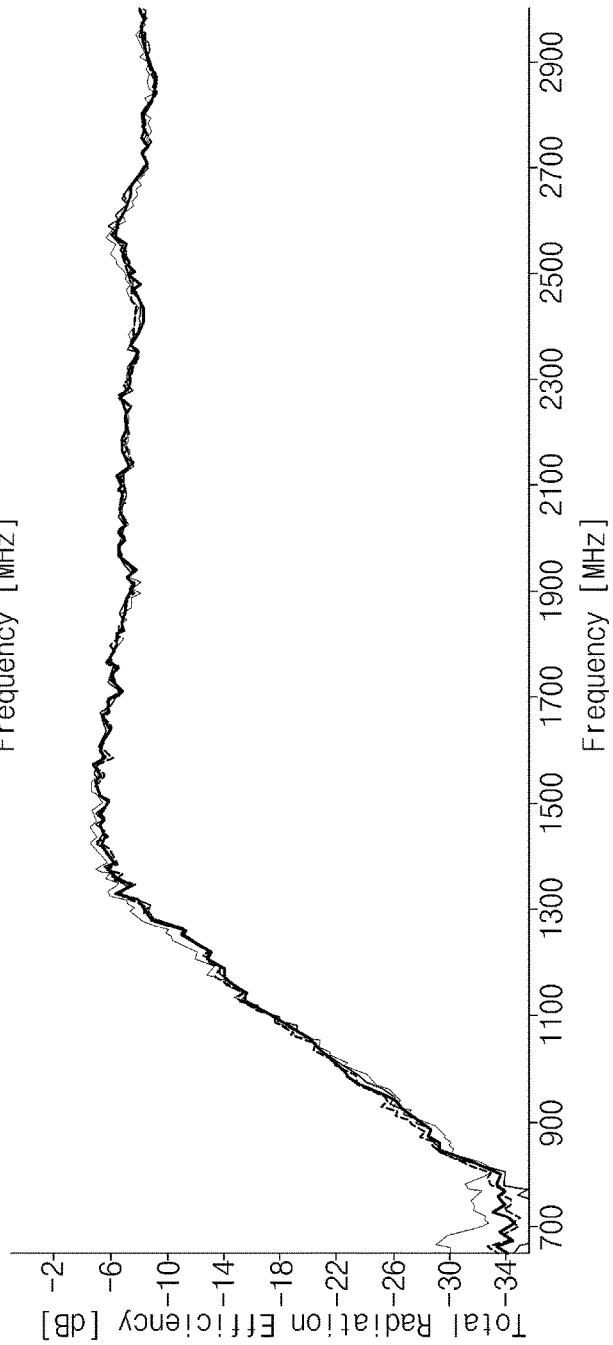
FIG. 17A
FIG. 17B

ELECTRONIC DEVICE INCLUDING ANTENNA

CROSS-REFERENCE TO RELATED APPLICATION(S)

This application is a Continuation of U.S. patent application Ser. No. 16/320,169 filed Jan. 24, 2019 and assigned U.S. Pat. No. 11,831,068, issued on Nov. 28, 2023, which is a Continuation of International Application No. PCT/KR2017/005454 filed May 25, 2017, which claims priority under 35 U.S.C. § 119 to Korean Patent Application No. 10-2016-0096566, filed on Jul. 29, 2016, in the Korean Intellectual Property Office, the disclosure of which is incorporated by reference herein its entirety.

TECHNICAL FIELD

Embodiments of the disclosure relates to a technology for designing an antenna.

BACKGROUND ART

An electronic device such as a smartphone, a tablet, or the like may communicate with a network by using an antenna. Unlike the 3rd generation (3G) network where some frequency bands (e.g., 900 MHZ, 1.8 GHZ, 2.1 GHZ, and the like) had been globally used, the 3G-next network (e.g., long term evolution (LTE), LTE-advanced (LTE-A), licensed assisted access (LAA), LTE in unlicensed spectrum (LTE-U), or the like) uses various frequency bands for each nation and/or operator. Also, the electronic device may communicate with a Wi-Fi network of a 2.4 GHz or 5 GHz band as well as a cellular network. An electronic device which is being released recently is equipped with a multi-band antenna covering a plurality of frequency bands for the purpose of supporting various networks.

DISCLOSURE

Technical Problem

An electronic device may include one matching circuit, which is matched with respect to all bands, for the purpose of implementing a multi-band antenna supporting a low-band (e.g., 600 MHz to 990 MHz), a mid-band (e.g., 1.4 GHz to 2.2 GHZ), and a high-band (e.g., 2.2 GHz to 6 GHZ). In this case, the efficiency of antenna may change sensitively despite a small change in impedance in a specific band (e.g., the high-band).

An aspect of the disclosure is to provide an electronic device including an antenna structure which may improve an efficiency with regard to signals in various bands.

Technical Solution

An electronic device according to an embodiment of the disclosure may include an antenna element including at least a portion of a housing of the electronic device and configured to resonate in a first frequency band, a conductive plate electrically connected with the antenna element, positioned within the housing, and configured to resonate in the first frequency band or in a second frequency band higher than the first frequency band, a filter circuit electrically connected with the conductive plate and having a pass band in the second frequency band, and a conductive member electrically connected with the conductive plate through the filter circuit and configured to resonate in the second frequency band.

Also, an electronic device according to an embodiment of the disclosure may include a first antenna element including at least a portion of a housing of the electronic device and configured to resonate in a first frequency band, a printed circuit board positioned within the housing, and a second antenna element positioned on the printed circuit board, electrically connected with the first antenna element, and configured to resonate in the first frequency band and in a second frequency band higher than the first frequency band.

Also, an electronic device according to an embodiment of the disclosure may include a housing that includes a first surface, a second surface facing away from the first surface, and a side surface surrounding a space between the first surface and the second surface, a display exposed through at least a portion of the first surface, a first conductive member forming a portion of the side surface, a second conductive member electrically connected with the first conductive member and included within the housing, a wireless communication circuit electrically connected with the second conductive member, a third conductive member included within the housing and positioned adjacent to the second conductive member, and a circuit electrically connected between the second conductive member and the third conductive member and including at least one of a capacitor or an inductor. The wireless communication circuit may be configured to transmit/receive a signal in a first frequency band, and to transmit/receive a signal in a second frequency band higher than the first frequency band by using the second conductive member and the third conductive member.

Advantageous Effects

According to embodiments of the disclosure, as a conductive member for resonance in the second frequency band is adopted within an electronic device, an efficiency of an antenna in the first frequency band and the second frequency band may be improved.

Also, as a filter circuit having a pass band in the second frequency band is adopted, an efficiency of an antenna in the second frequency band may be improved without reduction of an efficiency of an antenna in the first frequency band.

Besides, a variety of effects directly or indirectly understood through this disclosure may be provided.

DESCRIPTION OF DRAWINGS

FIG. 17A and FIG. 17B is a graph illustrating a radiation efficiency of an antenna included in an electronic device for each frequency, according to an embodiment.

MODE FOR INVENTION

Figure 1:
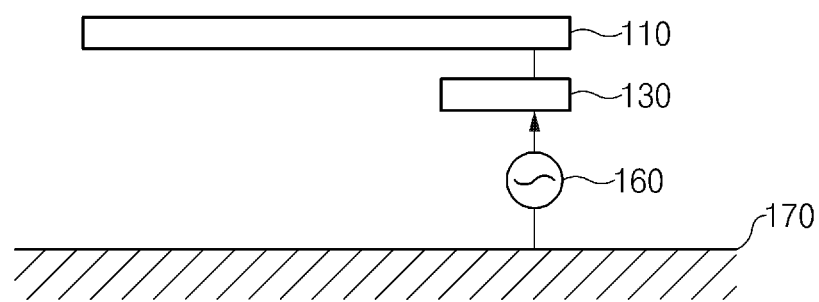
FIG. 1 illustrates a structure of an antenna included in an electronic device according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 illustrates a structure of an antenna included in an electronic device according to an embodiment.

According to an embodiment, an electronic device may include an antenna 100. The antenna 100 included in the electronic device may support a first frequency band and a second frequency band.

According to an embodiment, the first frequency band may correspond to a low-band (e.g., approximately 600 MHz to 990 MHZ) and/or a mid-band (e.g., approximately 1.4 GHz to 2.2 GHZ) defined in the 3GPP, and the second frequency band may correspond to a high-band (e.g., approximately 2.2 GHz to 6 GHZ). However, in another embodiment, the first frequency band and the second frequency band may be defined differently from the 3GPP. For example, the first frequency band may include one or more bands of the low-band, the mid-band, and a GPS frequency band (e.g., 1.57 GHZ). The second frequency band may include one or more service bands of the high-band, a Wi-Fi frequency band (e.g., 5 GHZ to 6 GHZ), LAA (licensed assisted access) (e.g., 5 GHz or higher), or LTE-U (LTE in unlicensed spectrum) (e.g., 5 GHz or higher). The second frequency band may be a band higher than the first frequency band.

Referring to FIG. 1, the antenna 100 included in the electronic device according to an embodiment may include a first antenna element (or a first conductive member) 110, a second antenna element (or a second conductive member) 130, a feed part 160, and a ground layer 170.

According to an embodiment, the electronic device may include a housing which includes a first surface (or a front surface), a second surface (or a rear surface) facing away from the first surface, and a side member surrounding a space between the first surface and the second surface. The electronic device may include a display exposed through at least a portion of the first surface.

According to an embodiment, the first antenna element 110 may include at least a portion of the housing of the electronic device. For example, the first antenna element 110 may form a portion of the side surface of the housing. According to an embodiment, the first antenna element 110 may include at least a portion of a metal frame. For example, the first antenna element 110 may be a portion of the metal frame placed on the upper left of the electronic device. The first antenna element 110 may be configured to resonate in the first frequency band. For example, the first antenna element 110 may have an electrical length capable of resonating in the first frequency band. The first antenna element 110 may operate as a radiator of the antenna 100. A resonance of the first frequency band may be made with the electrical length of the first antenna element 110. A signal in the first frequency band may be transmitted/received through the antenna 100.

According to an embodiment, the second antenna element 130 may be electrically connected to the first antenna element 110. The second antenna element 130 may be positioned within the housing of the electronic device. For example, the second antenna element 130 may be positioned on a printed circuit board (not illustrated) which is positioned within the housing of the electronic device. An electrical length of the second antenna element 130 may allow the second antenna element 130 to resonate in the second frequency band. A signal in the second frequency band may be transmitted/received through the antenna 100. For example, the second antenna element 130 may include a conductive plate, a filter circuit, and/or a conductive member, which will be described below with reference to FIG. 2.

According to an embodiment, the feed part 160 may be electrically connected with the second antenna element 130. The feed part 160 may feed a power into the second antenna element 130 and the first antenna element 110. For example, the feed part 160 may be electrically connected with a communication circuit, a transceiver, and/or a processor (e.g., a communication processor). The feed part 160 may be electrically connected with a wireless communication circuit. The wireless communication circuit may be electrically connected with the ground layer 170.

The ground layer 170 may be a conductor which is positioned within the housing of the electronic device.

Figure 2:
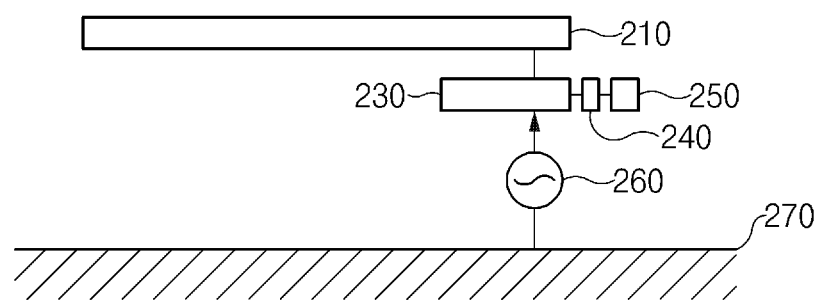
FIG. 2 illustrates a structure of an antenna included in an electronic device according to an embodiment.

FIG. 2 illustrates a structure of an antenna included in an electronic device according to an embodiment.

According to an embodiment, an electronic device may include an antenna 200. According to an embodiment, the antenna 200 may support the first frequency band and the second frequency band.

According to an embodiment, the electronic device may include a housing which includes a first surface (or a front surface), a second surface (or a rear surface) facing away from the first surface, and a side member surrounding a space between the first surface and the second surface. The electronic device may include a display exposed through at least a portion of the first surface.

Referring to FIG. 2, the antenna 200 included in the electronic device according to an embodiment may include a first antenna element (or a first conductive member) 210, a second antenna element (or a second conductive member) 230, a filter circuit 240, a third antenna element (or a third conductive member) 250, a feed part 260, and a ground layer 270. For convenience of description, below, the first antenna element 210 is referred to as an "antenna element 210", the second antenna element 230 is referred to as a "conductive plate 230", and the third antenna element 250 is referred to as a "conductive member 250". The antenna element 210, the feed part 260, and the ground layer 270 illustrated in FIG. 2 may be implemented to be similar to the antenna element 110, the feed part 160, and the ground layer 170 illustrated in FIG. 1, and thus, additional description associated with the antenna element 210, the feed part 260, and the ground layer 270 will be omitted to avoid redundancy.

According to an embodiment, the conductive plate 230 may be electrically connected with the antenna element 210. The conductive plate 230 may directly receive an electrical signal from the antenna element 210 or from the outside. The conductive plate 230 may be positioned (or included) within the housing of the electronic device. For example, the conductive plate 230 may be positioned on a printed circuit board (not illustrated) which is positioned within the housing of the electronic device, or may be embedded in the printed circuit board. The conductive plate 230 may be configured to resonate in the first frequency band and the second frequency band. For example, the conductive plate 230 may be configured to resonate in the first frequency band together with the antenna element 210. For another example, the conductive plate 230 may be configured to resonate in the second frequency band together with the conductive member 250. The conductive plate 230 may operate as a radiator of the antenna 200.

According to an embodiment, the filter circuit 240 may be electrically connected with the conductive plate 230. The filter circuit 240 may be electrically connected between the conductive plate 230 and the conductive member 250. The filter circuit 240 may include at least one of a capacitor or an inductor. The filter circuit 240 may also include a transmission line having a capacitance or an inductance. The filter circuit 240 may have a pass band in the second frequency band. For example, the pass band of the filter circuit 240 may include all or a part of the second frequency band. The filter circuit 240 may pass an electrical signal from the conductive plate 230. For example, when the conductive plate 230 receives a signal in the first frequency band and a signal in the second frequency band, the filter circuit 240 may pass a signal in the second frequency band (or most of the signal in the second frequency band) included in the pass band, and may cut off or attenuate a signal in the first frequency band (or most of the signal in the first frequency band) included in a stop band.

According to an embodiment, the conductive member 250 may be positioned adjacent to the conductive plate 230. The conductive member 250 may be electrically connected with the conductive plate 230 through the filter circuit 240. The conductive member 250 may receive an electrical signal from the filter circuit 240 or directly from the outside. The conductive member 250 may be positioned within the housing of the electronic device. For example, the conductive member 250 may be positioned on a printed circuit board which is positioned within the housing of the electronic device. For example, the conductive member 250 may be printed on the printed circuit board. The conductive member 250 may be configured to resonate in the second frequency band. For example, the conductive member 250 may resonate in a band close to the second frequency band together with the conductive plate 230 and the filter circuit 240. The filter circuit 240 and the conductive member 250 which are added may make a center frequency of the second frequency band low. The conductive member 250 may operate as a radiator of the antenna 200. For example, the conductive member 250 may transmit/receive a signal in the second frequency band.

According to an embodiment, the filter circuit 240 and the conductive member 250 may be designed such that an influence on a resonance in the first frequency band by the antenna element 210 and the conductive plate 230 decreases. For example, the influence of the conductive member 250 may be reduced by the filter circuit 240. In the case of tuning the conductive member 250 for a resonance in the second frequency band, the influence of the tuning of the conductive member 250 on the resonance in the first frequency band may be reduced by the filter circuit 240.

According to an embodiment, the feed part 260 may be electrically connected with a wireless communication circuit. The wireless communication circuit may transmit/receive a signal in the first frequency band by using the antenna element 210. The wireless communication circuit may transmit/receive a signal in the second frequency band higher than the first frequency band by using the conductive plate 230 and the conductive member 250.

Figure 3:
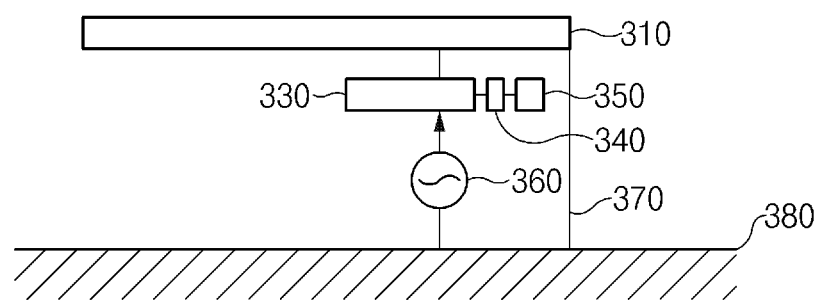
FIG. 3 illustrates a structure of an antenna included in an electronic device according to an embodiment.

FIG. 3 illustrates a structure of an antenna included in an electronic device according to an embodiment.

According to an embodiment, an electronic device may include an antenna 300. According to an embodiment, the antenna 300 may support the first frequency band and the second frequency band. According to an embodiment, the antenna 300 may be an inverted F antenna (IFA) or a planar inverted F antenna (PIFA).

Referring to FIG. 3, the antenna 300 included in the electronic device according to an embodiment may include a first antenna element (or a first conductive member) 310, a second antenna element (or a second conductive member) 330, a filter circuit 340, a third antenna element (or a third conductive member) 350, a feed part 360, a ground part 370, and/or a ground layer 380. For convenience of description, below, the first antenna element 310 is referred to as an "antenna element 310", the second antenna element 330 is referred to as a "conductive plate 330", and the third antenna element 350 is referred to as a "conductive member 350". The antenna element 310, the conductive plate 330, the filter circuit 340, the conductive member 350, the feed part 360, and the ground layer 380 illustrated in FIG. 3 may be implemented to be similar to the antenna element 210, the conductive plate 230, the filter circuit 240, the conductive member 250, the feed part 260, and the ground layer 270 illustrated in FIG. 2, and thus, additional description associated with the antenna element 310, the conductive plate 330, the filter circuit 340, the conductive member 350, the feed part 360, and the ground layer 380 will be omitted to avoid redundancy.

According to an embodiment, the antenna element 310 may be electrically connected with the ground layer 380. For example, one end of the antenna element 310 may be electrically connected with the ground layer 380 through the ground part 370. As the one end of the antenna element 310 is connected with the ground layer 380, the inverted F antenna (IFA) or the planar inverted F antenna (PIFA) may be implemented.

According to an embodiment, in the case where the antenna element 310 and the ground layer 380 are connected, a point where the antenna element 310 and the conductive plate 330 are connected may be spaced from a point where the antenna element 310 and the ground layer 380 are connected, as much as a given distance. For example, compared to the antenna 200 of FIG. 2, the point where the antenna element 310 and the conductive plate 330 are connected may be moved toward the center of the antenna element 310.

Figure 4:
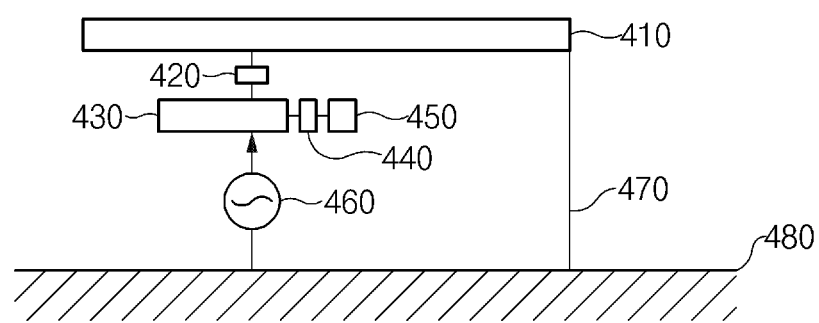
FIG. 4 illustrates a structure of an antenna included in an electronic device according to an embodiment.

FIG. 4 illustrates a structure of an antenna included in an electronic device according to an embodiment.

According to an embodiment, an electronic device may include an antenna 400. According to an embodiment, the antenna 400 may support the first frequency band and the second frequency band. According to an embodiment, the antenna 400 may be an inverted F antenna (IFA) or a planar inverted F antenna (PIFA).

Referring to FIG. 4, the antenna 400 included in the electronic device according to an embodiment may include a first antenna element (or a first conductive member) 410, a capacitor 420, a second antenna element (or a second conductive member) 430, a filter circuit 440, a third antenna element (or a third conductive member) 450, a feed part 460, a ground part 470, and/or a ground layer 480. For convenience of description, below, the first antenna element 410 is referred to as an "antenna element 410", the second antenna element 430 is referred to as a "conductive plate 430", and the third antenna element 450 is referred to as a "conductive member 450". The antenna element 410, the conductive plate 430, the filter circuit 440, the conductive member 450, the feed part 460, the ground part 470, and the ground layer 480 illustrated in FIG. 4 may be implemented to be similar to the antenna element 310, the conductive plate 330, the filter circuit 340, the conductive member 350, the feed part 360, the ground part 370, and the ground layer 380 illustrated in FIG. 3, and thus, additional description associated with the antenna element 410, the conductive plate 430, the filter circuit 440, the conductive member 450, the feed part 460, the ground part 470, and the ground layer 480 will be omitted to avoid redundancy.

According to an embodiment, the capacitor 420 may be electrically connected with the antenna element 410 and the conductive plate 430. For example, one end of the capacitor 420 may be electrically connected with the antenna element 410, and an opposite end thereof may be electrically connected with the conductive plate 430. The capacitor 420 may be a lumped element.

According to an embodiment, as the capacitor 420 is adopted between the antenna element 410 and the conductive plate 430, a resonant frequency of an electrical path connecting the antenna element 410 and the conductive plate 430 may be adjusted.

Figure 5:
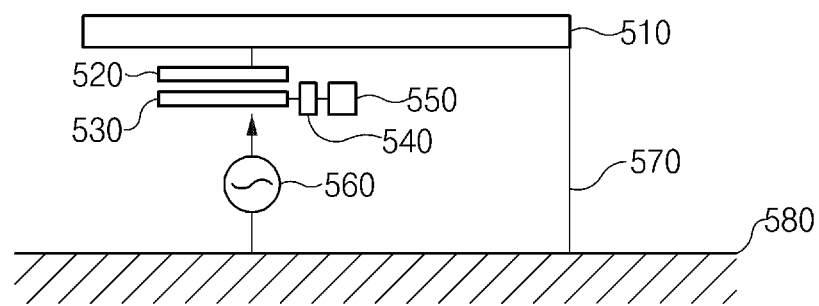
FIG. 5 illustrates a structure of an antenna included in an electronic device according to an embodiment.

FIG. 5 illustrates a structure of an antenna included in an electronic device according to an embodiment.

According to an embodiment, an electronic device may include an antenna 500. According to an embodiment, the antenna 500 may support the first frequency band and the second frequency band. According to an embodiment, the antenna 500 may be an inverted F antenna (IFA) or a planar inverted F antenna (PIFA).

Referring to FIG. 5, the antenna 500 included in the electronic device may include an antenna element 510, a first conductive layer 520, a second conductive layer 530, a filter circuit 540, a conductive member 550, a feed part 560, a ground part 570, and/or a ground layer 580. The antenna element 510, the filter circuit 540, the conductive member 550, the feed part 560, the ground part 570, and the ground layer 580 illustrated in FIG. 5 may be implemented to be similar to the antenna element 410, the filter circuit 440, the conductive member 450, the feed part 460, the ground part 470, and the ground layer 480 illustrated in FIG. 4, and thus, additional description associated with the antenna element 510, the filter circuit 540, the conductive member 550, the feed part 560, and/or the ground layer 580 will be omitted to avoid redundancy.

According to an embodiment, the first conductive layer 520 may be electrically connected with the antenna element 510. The first conductive layer 520 may transmit/receive a signal from the antenna element 510. The first conductive layer 520 may be positioned within a housing of the electronic device. For example, the first conductive layer 520 may be positioned on a printed circuit board (not illustrated) of the electronic device, or may be embedded in the printed circuit board. The first conductive layer 520 may be configured to resonate in the first frequency band. For example, the first conductive layer 520 may be configured to resonate in the first frequency band together with the antenna element 510. The first conductive layer 520 may operate as a radiator of the antenna 500.

According to an embodiment, the second conductive layer 530 may be positioned parallel to the first conductive layer 520 and may be spaced from the first conductive layer 520. The second conductive layer 530 may be electrically coupled with the first conductive layer 520. For example, in the case where the first conductive layer 520 is positioned below the printed circuit board, the second conductive layer 530 may be positioned above the printed circuit board. For another example, the first conductive layer 520 and the second conductive layer 530 may be embedded in parallel within the printed circuit board. The first conductive layer 520 and the second conductive layer 530 may be electrically coupled, with a printed circuit board formed of a dielectric interposed therebetween. In this case, the first conductive layer 520 and the second conductive layer 530 may act as a capacitive element. The second conductive layer 530 may be implemented to be similar to the conductive plate 430 illustrated in FIG. 4.

According to an embodiment, because the first conductive layer 520 and the second conductive layer 530 are electrically coupled, the first conductive layer 520 and the second conductive layer 530 may electrically connect the antenna element 510 and the feed part and may replace a capacitive element.

Figure 6:
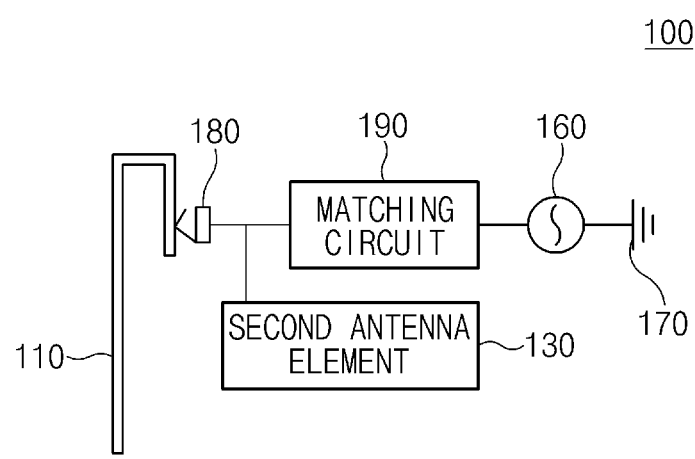
FIG. 6 is a block diagram illustrating a structure of an antenna included in an electronic device according to an embodiment.

FIG. 6 is a block diagram illustrating a structure of an antenna included in an electronic device according to an embodiment.

Referring to FIG. 6, an electronic device according to an embodiment may include the antenna 100. The antenna 100 illustrated in FIG. 6 may be configured to be identical or similar to the antenna 100 illustrated in FIG. 1. The antenna 100 included in the electronic device according to an embodiment may include the first antenna element 110, a second antenna element 130, the feed part 160, the ground layer 170, a connection member 180, and a matching circuit 190. Thus, additional description associated with the first antenna element 110, the second antenna element 130, the feed part 160, and the ground layer 170 of FIG. 1 corresponding to components of FIG. 6 will be omitted to avoid redundancy.

According to an embodiment, the connection member 180 may be interposed between the first antenna element 110 and the second antenna element 130. The connection member 180 may electrically connect the first antenna element 110 and the second antenna element 130. The connection member 180 may be formed of a conductive material. The connection member 180 may be formed of a flexible material. For example, the connection member 180 may be a C-clip, a flexible connection member, a pogo pin, a screw, or a spring.

According to an embodiment, the matching circuit 190 may be electrically connected with the first antenna element 110. The matching circuit 190 may be connected with the first antenna element 110 through the connection member 180. The matching circuit 190 may make impedance matching such that the antenna 100 may operate in the first frequency band or the second frequency band.

According to an embodiment, the second antenna element 130, the feed part 160, the ground layer 170, the connection member 180, and the matching circuit 190 may be on the printed circuit board or may be included within the printed circuit board.

Figure 7:
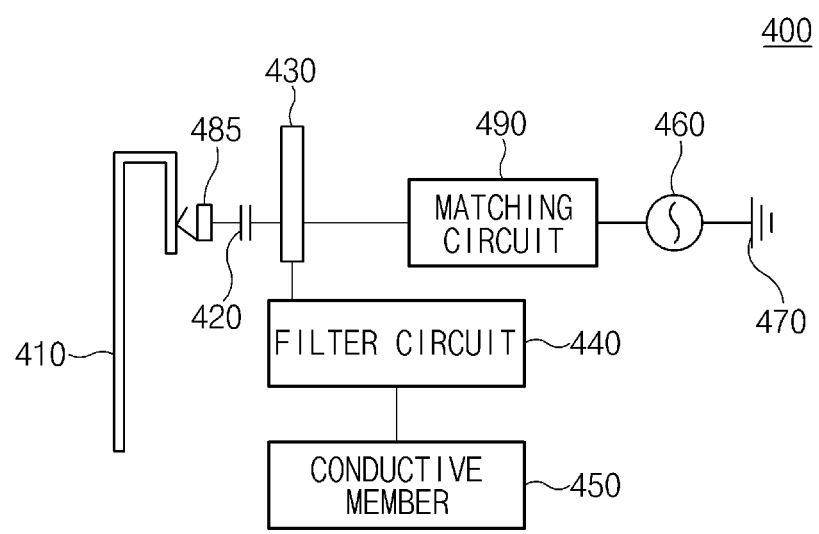
FIG. 7 is a block diagram illustrating a structure of an antenna included in an electronic device according to an embodiment.

FIG. 7 is a block diagram illustrating a structure of an antenna included in an electronic device according to an embodiment.

Referring to FIG. 7, an electronic device according to an embodiment may include the antenna 400. The antenna 400 illustrated in FIG. 7 may be configured to be identical or similar to the antenna 400 illustrated in FIG. 4. The antenna 400 included in the electronic device according to an embodiment may include the antenna element 410, the capacitor 420, the conductive plate 430, the filter circuit 440, the conductive member 450, the feed part 460, the ground part 470, the connection member 485, and/or a matching circuit 490. Additional description associated with the antenna element 410, the capacitor 420, the conductive plate 430, the filter circuit 440, the conductive member 450, the feed part 460, and the ground part 470 of FIG. 4 corresponding to the components of FIG. 7 will be omitted to avoid redundancy.

According to an embodiment, the connection member 485 may be interposed between the antenna element 410 and the capacitor 420. The connection member 485 may electrically connect the antenna element 410 and the capacitor 420. The connection member 485 may be formed of a conductive material. For example, the connection member 485 may be a C-clip, a flexible connection member, a pogo pin, a screw, or a spring.

According to an embodiment, the matching circuit 490 may be interposed between the feed part 460 and the conductive plate 430. The matching circuit 490 may be electrically connected with the feed part 460 and the conductive plate 430. For example, the matching circuit 490 may make impedance matching such that the antenna 400 may operate in the first frequency band or the second frequency band.

According to an embodiment, the filter circuit 440 and the conductive member 450 may be designed such that an influence on a resonance in the first frequency band by the antenna element 410 and the conductive plate 430 decreases. For example, the influence of the conductive member 450 may be reduced by the filter circuit 440. In the case of tuning the conductive member 450 for a resonance in the second frequency band, the influence of the tuning of the conductive member 450 on the resonance in the first frequency band may be reduced by the filter circuit 240.

Figure 8:
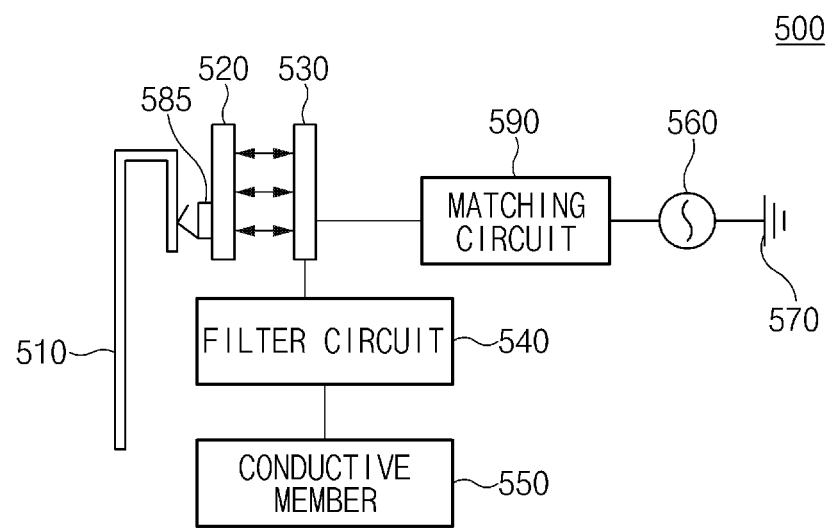
FIG. 8 is a block diagram illustrating a structure of an antenna included in an electronic device according to an embodiment.

FIG. 8 is a block diagram illustrating a structure of an antenna included in an electronic device according to an embodiment.

Referring to FIG. 8, an electronic device according to an embodiment may include the antenna 500. The antenna 500 illustrated in FIG. 8 may be configured to be identical or similar to the antenna 500 illustrated in FIG. 5. The antenna 500 included in the electronic device according to an embodiment may include the antenna element 510, the first conductive layer 520, the second conductive layer 530, the filter circuit 540, the conductive member 550, the feed part 560, the ground part 570, a connection member 585, and/or a matching circuit 590. Additional description associated with the antenna element 510, the first conductive layer 520, the second conductive layer 530, the filter circuit 540, the conductive member 550, the feed part 560, and the ground part 570 of FIG. 5 corresponding to the components of FIG. 8 will be omitted to avoid redundancy.

According to an embodiment, the connection member 585 may be interposed between the antenna element 510 and the first conductive layer 520. The connection member 585 may electrically connect the antenna element 510 and the first conductive layer 520. The connection member 585 may be formed of a conductive material and may be, for example, a C-clip.

According to an embodiment, the matching circuit 590 may be interposed between the feed part 560 and the second conductive layer 530. For example, the matching circuit 590 may make impedance matching such that the antenna 500 may operate in the first frequency band or the second frequency band.

According to an embodiment, the first conductive layer 520 and the second conductive layer 530 may be electrically coupled, with a printed circuit board formed of a dielectric interposed therebetween. In this case, the first conductive layer 520 and the second conductive layer 530 may act as a capacitive element.

Figure 9:
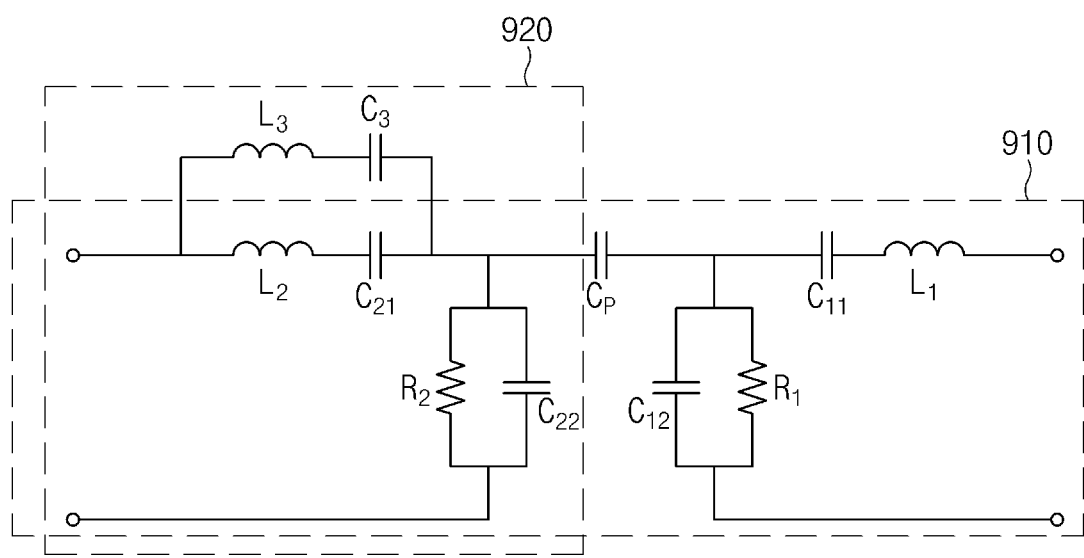
FIG. 9 is a circuit diagram illustrating an equivalent circuit of an antenna included in an electronic device according to an embodiment.

FIG. 9 is a circuit diagram illustrating an equivalent circuit of an antenna included in an electronic device according to an embodiment.

The circuit diagram illustrated in FIG. 9 may indicate an equivalent circuit of an antenna illustrated in FIGS. 4 and 5. For example, with regard to FIGS. 4, $R_1$, $L_1$, $C_{11}$, and $C_{12}$ may correspond to the antenna element 410, $R_2$, $L_2$, $C_{21}$, and $C_{22}$ may correspond to the conductive plate 430, $L_3$ and $C_3$ may correspond to the filter circuit 440 and the conductive member 450, and $C_p$ may correspond to the capacitor 420. For another example, with regard to FIG. 5, $R_1$, $L_1$, $C_{11}$, and $C_{12}$ may correspond to the antenna element 510 and the first conductive layer 520, $R_2$, $L_2$, $C_{21}$, and $C_{22}$ may correspond to the second conductive layer 330, $L_3$ and $C_3$ may correspond to the filter circuit 540 and the conductive member 550, and $C_p$ may correspond to a capacitance between the first conductive layer 520 and the second conductive layer 530.

According to an embodiment, elements included in an area 910 may resonate in the first frequency band. For example, the antenna element 410, the capacitor 420, and the conductive plate 430 of FIG. 4 may resonate in the first frequency band. For another example, the antenna element 510, the first conductive layer 520, and the second conductive layer 530 of FIG. 5 may resonate in the first frequency band. An electronic device according to an embodiment may receive a signal in the first frequency band by using the elements included in the area 910.

According to an embodiment, elements included in an area 920 may resonate in the second frequency band. For example, the conductive plate 430, the filter circuit 440, and the conductive member 450 of FIG. 4 may resonate in the second frequency band. For another example, the second conductive layer 530, the filter circuit 540, and the conductive member 550 of FIG. 5 may resonate in the second frequency band. The electronic device according to an embodiment may receive a signal in the second frequency band by using the elements included in the area 920.

Figure 10:
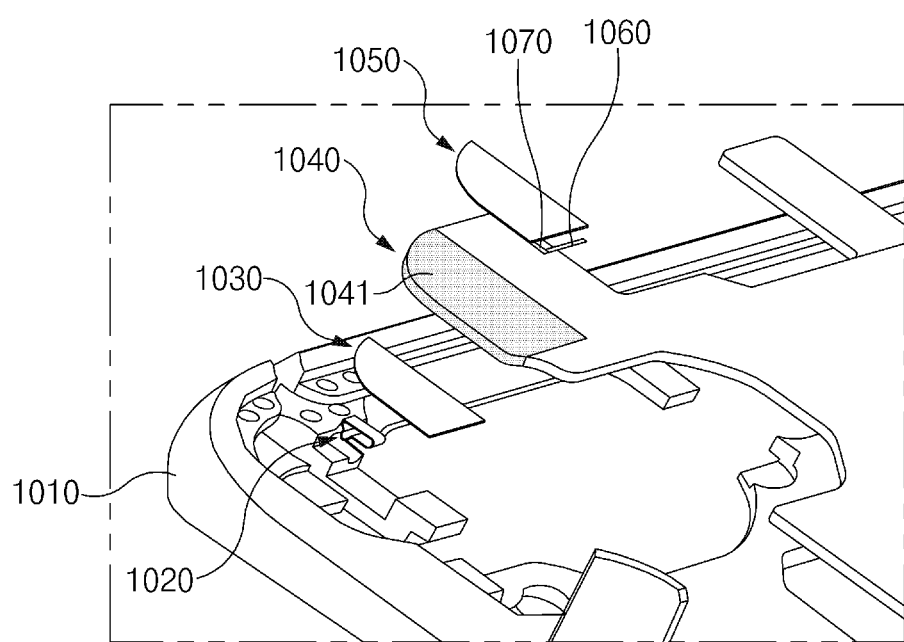
FIG. 10 is an exploded perspective view of a part of an electronic device according to an embodiment.
Figure 11:
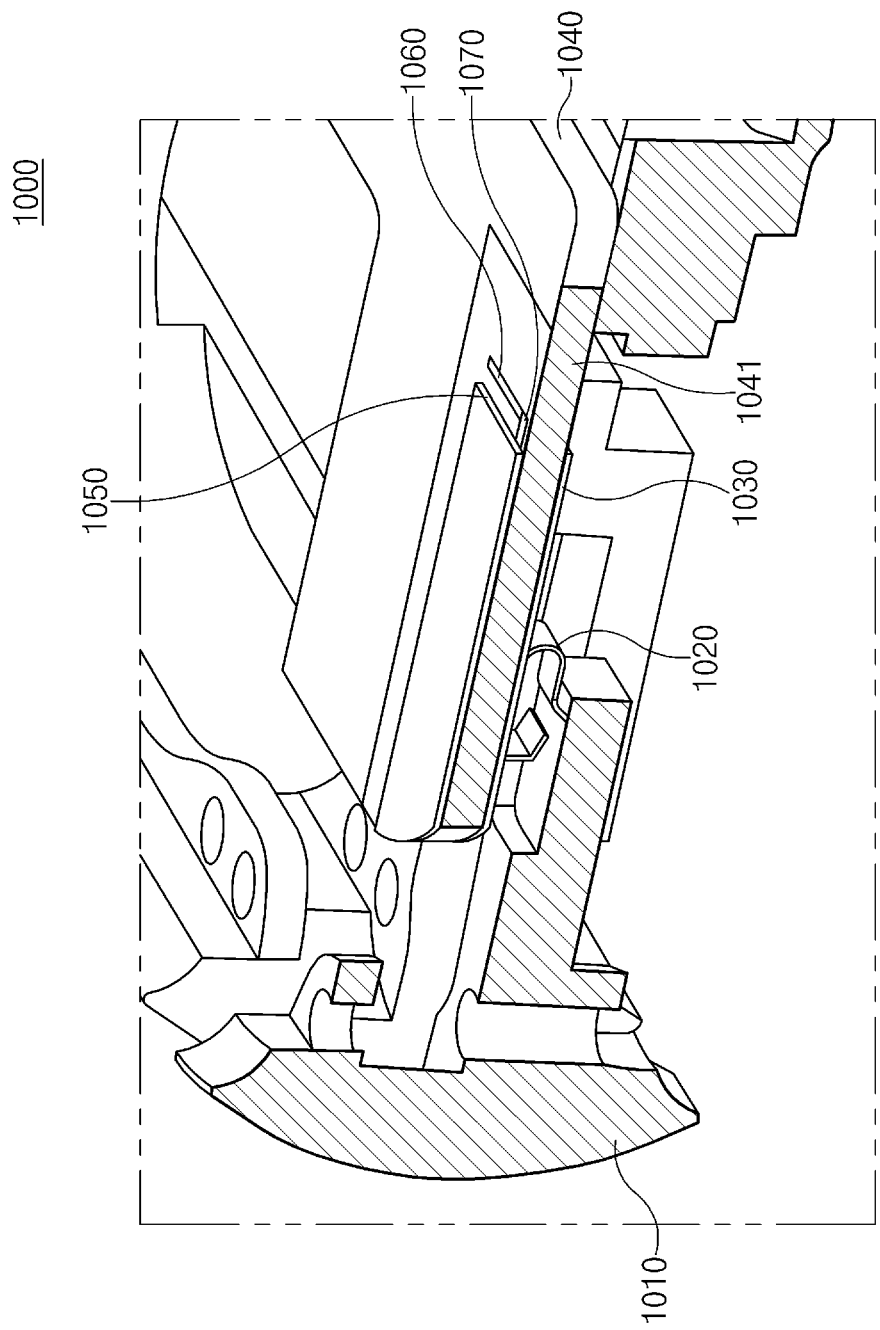
FIG. 11 is a sectional view of a part of an electronic device according to an embodiment.

FIG. 10 is an exploded perspective view of a part of an electronic device according to an embodiment. FIG. 11 is a sectional view of a part of an electronic device according to an embodiment.

Referring to FIGS. 10 and 11, an electronic device may include an antenna element 1010, a connection member 1020, a first conductive layer 1030, a printed circuit board 1040, a second conductive layer 1050, a conductive member 1060, and a filter circuit 1070. The antenna element 1010, the connection member 1020, the first conductive layer 1030, the second conductive layer 1050, the conductive member 1060, and the filter circuit 1070 illustrated in FIGS. 10 and 11 may respectively correspond to the antenna element 510, the connection member 585, the first conductive layer 520, the second conductive layer 530, the conductive member 550, and the filter circuit 540 illustrated in FIG. 8.

According to an embodiment, the antenna element 1010 may form at least a portion of a side housing of the electronic device. For example, the antenna element 1010 may be a portion of a metal frame placed on the upper right of the electronic device.

According to an embodiment, the connection member 1020 may contact the antenna element 1010. The connection member 1020 may be inserted or mounted in a groove formed at the antenna element 1010. The connection member 1020 may be electrically connected with the antenna element 1010.

According to an embodiment, the first conductive layer 1030 may be electrically connected with the connection member 1020. The first conductive layer 1030 may be positioned above the connection member 1020. The first conductive layer 1030 may have a structure of a plate shape.

According to an embodiment, the printed circuit board 1040 may be positioned within a housing of the electronic device. The printed circuit board 1040 may be interposed between the first conductive layer 1030 and the second conductive layer 1050. For example, the first conductive layer 1030 may be positioned below an area of the printed circuit board 1040. The area 1041 of the printed circuit board 1040 may be formed of a material different from a material of any other area. For example, the area 1041 of the printed circuit board 1040 may be formed of flame retardant 4 (FR-4).

According to an embodiment, the second conductive layer 1050 may be positioned above the printed circuit board 1040. For example, the second conductive layer 1050 may be positioned above the flame retardant 4 (FR-4) included in the printed circuit board 1040. The second conductive layer 1050 may be positioned parallel to the first conductive layer 1030 at a location corresponding to the first conductive layer 1030. The second conductive layer 1050 may be implemented in the same shape as the first conductive layer 1030.

According to an embodiment, the conductive member 1060 may be printed on the printed circuit board 1040. For example, the conductive member 1060 may be elongated along the printed circuit board 1040. For example, as illustrated in FIG. 10, the conductive member 1060 may extend in parallel with one side surface of the second conductive layer 1050.

According to an embodiment, the filter circuit 1070 may be electrically connected with the second conductive layer 1050 and the conductive member 1060. An example is illustrated in FIGS. 10 and 11 as the filter circuit 1070 is a strip connecting the second conductive layer 1050 and the conductive member 1060, but the disclosure is not limited thereto. For example, the filter circuit 1070 may be implemented in various shapes designed to have a pass band with regard to the second frequency band.

Figure 12:
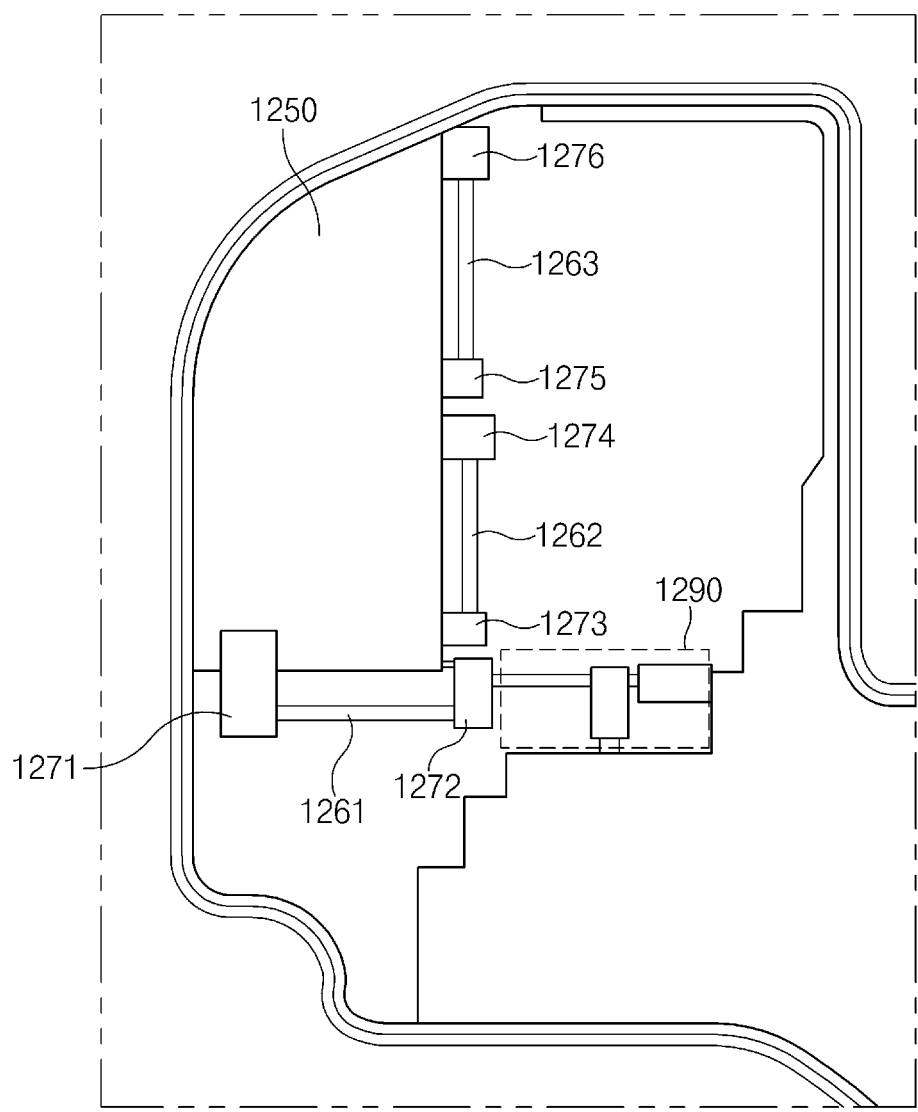
FIG. 12 is a plan view of a part of the electronic device according to an embodiment.

FIG. 12 is a plan view of a part of the electronic device according to an embodiment.

According to an embodiment, an electronic device may include a plurality of conductive members, and may include a plurality of filter circuits respectively connected with the plurality of conductive members. An impedance may be matched to resonate at a plurality of frequencies by including the plurality of conductive members and the plurality of filter circuits.

Referring to FIG. 12, the electronic device may include a second conductive layer 1250, a first conductive member 1261, a second conductive member 1262, a third conductive member 1263, first filter circuits 1271 and 1272, second filter circuits 1273 and 1274, third filter circuits 1275 and 1276, and a matching circuit 1290.

According to an embodiment, the first conductive member 1261 may be positioned below the second conductive layer 1250. The first conductive member 1261 may be configured to resonate in a specific frequency band in the second frequency band. The first conductive member 1261 may also resonate in a frequency band different from the second frequency band. Opposite ends of the first conductive member 1261 may be electrically connected with the second conductive layer 1250 through the first filter circuits 1271 and 1272. In this case, a pass band of the first filter circuits 1271 and 1272 may include a frequency band in which the first conductive member 1261 resonates.

According to an embodiment, the second conductive member 1262 may be positioned on a right side of a lower portion of the second conductive layer 1250. The second conductive member 1262 may be configured to resonate in a specific frequency band in the second frequency band. The second conductive member 1262 may also resonate in a frequency band different from the second frequency band. The second conductive member 1262 may be configured to resonate in a frequency band different from the first conductive member 1261. Opposite ends of the second conductive member 1262 may be electrically connected with the second conductive layer 1250 through the second filter circuits 1273 and 1274. In this case, a pass band of the second filter circuits 1273 and 1274 may include a frequency band in which the second conductive member 1262 resonates.

According to an embodiment, the third conductive member 1263 may be positioned on a right side of an upper portion of the second conductive layer 1250. The third conductive member 1263 may be configured to resonate in a specific frequency band in the second frequency band. The third conductive member 1263 may also resonate in a frequency band different from the second frequency band. The third conductive member 1263 may be configured to resonate in a frequency band different from the first conductive member 1261 and the second conductive member 1262. Opposite ends of the third conductive member 1263 may be electrically connected with the second conductive layer 1250 through the third filter circuits 1275 and 1276. In this case, a pass band of the third filter circuits 1275 and 1276 may include a frequency band in which the third conductive member 1263 resonates.

Figure 13:
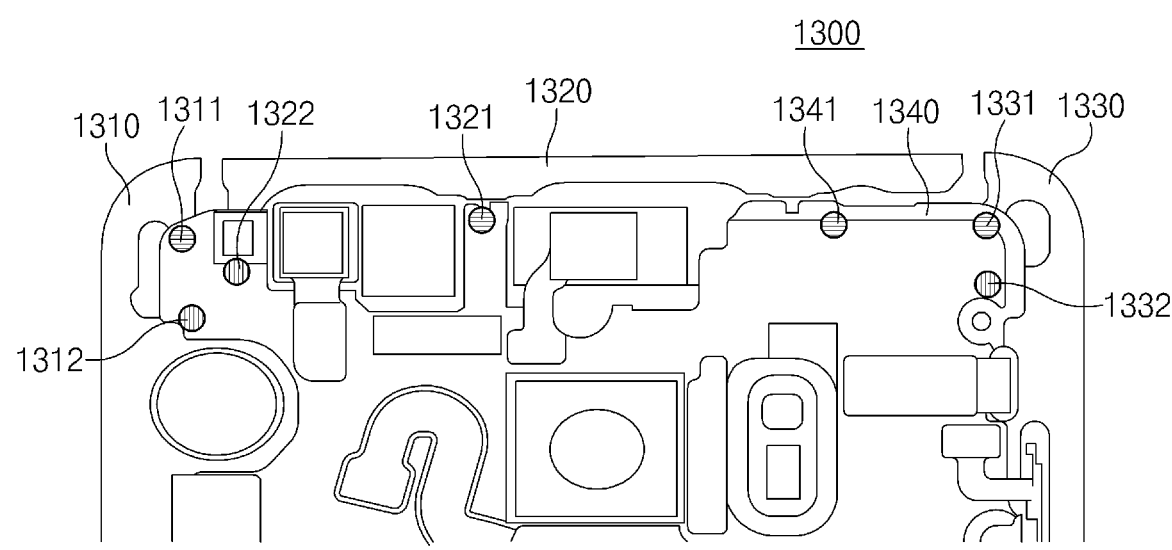
FIG. 13 is a plan view of a part of an electronic device according to an embodiment.

FIG. 13 is a plan view of a part of an electronic device according to an embodiment.

According to various embodiments of the disclosure, referring to FIG. 13, an electronic device 1300 may include a first metal frame 1310, a second metal frame 1320, a third metal frame 1330, a conductive pattern 1340, a first feed part 1311, a second feed part 1321, a third feed part 1331, a fourth feed part 1331, a first ground part 1312, a second ground part 1322, and/or a third ground part 1332.

According to various embodiments, the first metal frame 1310 may transmit or receive a GPS signal, a high-band signal, and a mid-band signal. The first metal frame 1310 may be electrically connected with the first feed part 1311 and the first ground part 1312.

According to various embodiments, the second metal frame 1320 may transmit or receive a low-band signal and a mid-band signal. The second metal frame 1320 may operate together with the conductive pattern 1340. The second metal frame 1320 may be electrically connected with the second feed part 1321 and the second ground part 1322.

According to various embodiments, the third metal frame 1330 may transmit or receive a Bluetooth signal and a Wi-Fi signal. The third metal frame 1330 may operate together with a pattern (not illustrated) printed on a printed circuit board. The third metal frame 1330 may be electrically connected with the third feed part 1331 and the third ground part 1332.

According to various embodiments, the conductive pattern 1340 may transmit or receive a Wi-Fi signal. The conductive pattern 1340 may transmit or receive a Wi-Fi signal in a different band from the third metal frame 1330. The conductive pattern 1340 may be a laser direct structuring (LDS) pattern. The conductive pattern 1340 may be electrically connected with the fourth feed part 1331.

Figure 14:
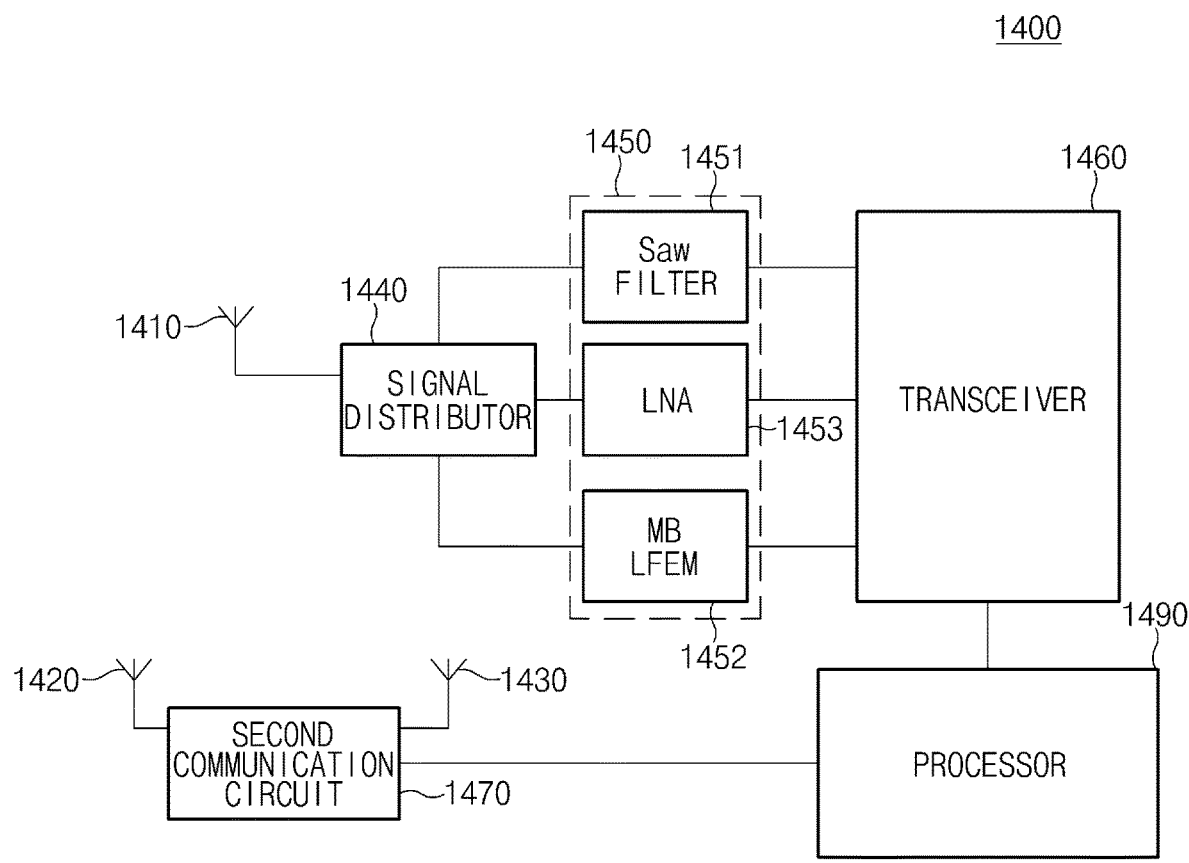
FIG. 14 is a block diagram illustrating a configuration of an electronic device according to an embodiment.

FIG. 14 is a block diagram illustrating a configuration of an electronic device according to an embodiment.

According to various embodiments of the disclosure, referring to FIG. 14, an electronic device 1400 may include a first antenna 1410, a second antenna 1420, a third antenna 1430, a signal distributer 1440, a first communication circuit 1450, a transceiver 1460, a second communication circuit 1470, and/or a processor 1490.

According to an embodiment, the first antenna 1410 may support the first frequency band and the second frequency band. The first antenna 1410 may be one of the antennas 100, 200, 300, 400, and 500 illustrated in FIGS. 1 to 5.

According to various embodiments, the second antenna 1420 and the third antenna 1430 may support the second frequency band and may also support a different frequency band.

According to various embodiments, the signal distributor 1440 may be electrically connected with the first antenna 1410. For example, the signal distributer 1440 may be electrically connected with a conductive plate included in the first antenna 1410. The signal distributor 1440 may be a multiplexer, and may be, for example, a triplexer. The signal distributer 1440 may include one or more filters. For example, the signal distributor 1440 may include three filters. The signal distributer 1440 may transmit a GPS signal of signals received by the first antenna 1410 to a SAW filter 1451. The signal distributer 1440 may transmit a mid-band signal to an MB LFEM 1452. The signal distributer 1440 may transmit a high-band signal to an LNA 1453.

According to various embodiments, the first communication circuit 1450 may be electrically connected with the signal distributer 1440 and may process a signal in the first frequency band. For example, the first communication circuit 1450 may include the surface acoustic wave (SAW) filter 1451, the MB LNA/FEMID (MB LFEM) 1452, and the low-noise amplifier (LNA) 1453. For example, the SAW filter 1451 may receive a GPS signal from the signal distributer 1440, may filter a portion of the GPS signal, and may transmit a result of the filtering to the transceiver 1460. The MB LFEM 1452 may be a circuit including an LNA and front end module with integrated duplexers (FEMiD). For example, the MB LFEM 1452 may receive a mid-band signal from the signal distributer 1440, may amplify or separate the received signal, and may transmit a result of the amplifying or separating to the transceiver 1460. The LNA 1453 may amplify a signal received from the signal distributer 1440 and may transmit the amplified signal to the transceiver 1460.

According to various embodiments, the transceiver 1460 may be electrically connected with the SAW filter 1451, the MB LFEM 1452, and/or the LNA 1453. The transceiver 1460 may be electrically connected with the processor 1490.

According to various embodiments, the second communication circuit 1470 may process a signal in the second frequency band. The second communication circuit 1470 may include, for example, a Wi-Fi communication circuit. The second communication circuit 1470 may receive a signal in the second frequency band from the second antenna 1420 and/or the third antenna 1430. The second communication circuit 1470 may process a signal in the second frequency band and may transmit the processed signal to the processor 1490.

According to various embodiments, the processor 1490 may be electrically connected with the first communication circuit 1450 and the second communication circuit 1470. The processor 1490 may be, for example, a communication processor (CP) 1490. The processor 1490 may control the first communication circuit 1450 and the second communication circuit 1470, and may process signals received from the first communication circuit 1450 and the second communication circuit 1470.

Figure 15:
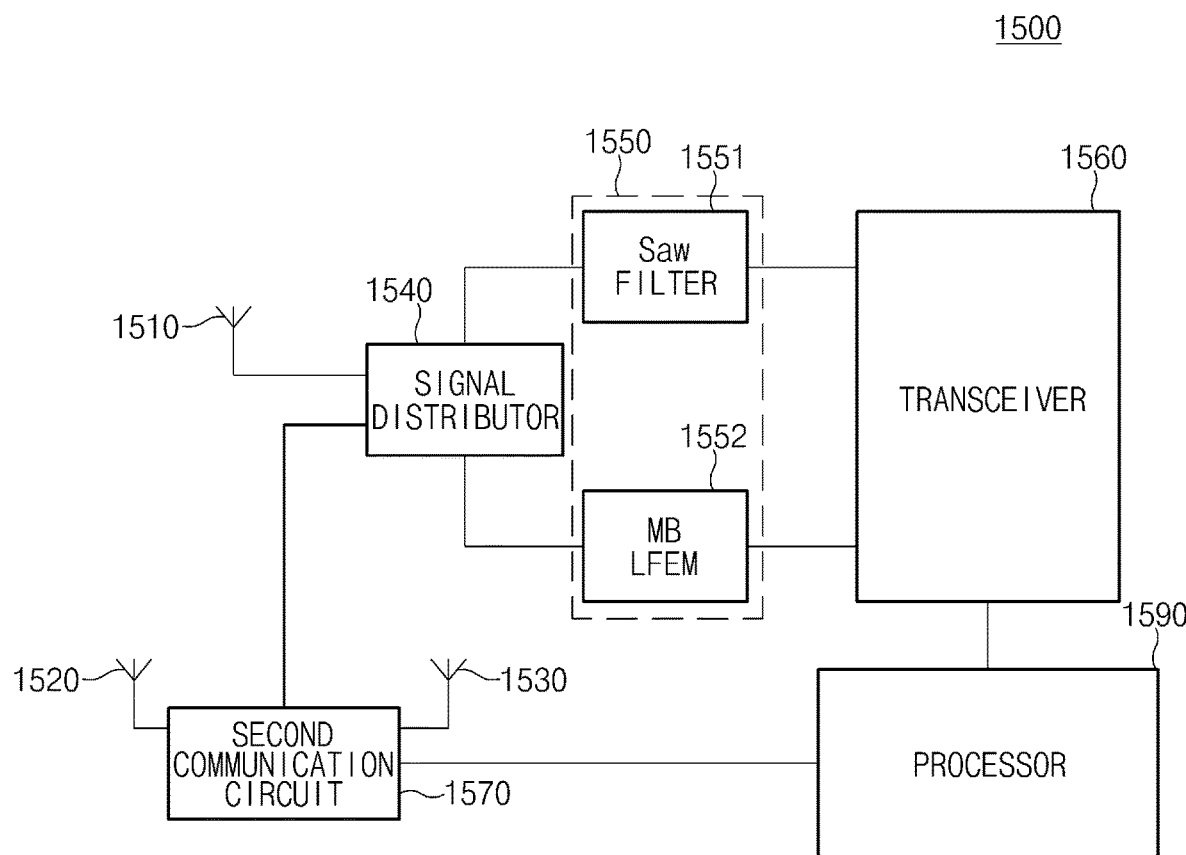
FIG. 15 is a block diagram illustrating a configuration of an electronic device according to an embodiment.

FIG. 15 is a block diagram illustrating a configuration of an electronic device according to an embodiment.

Referring to FIG. 15, an electronic device 1500 may include a first antenna 1510, a second antenna 1520, a third antenna 1530, a signal distributer 1540, a first communication circuit 1550, a transceiver 1560, a second communication circuit 1570, and/or a processor 1590.

According to an embodiment, the first antenna 1510 may support the first frequency band and the second frequency band. The first antenna 1510 may be one of the antennas 100, 200, 300, 400, and 500 illustrated in FIGS. 1 to 5.

According to an embodiment, the second antenna 1520 and the third antenna 1530 may support the second frequency band and may also support a different frequency band.

According to an embodiment, the signal distributor 1540 may be electrically connected with the first antenna 1510. For example, the signal distributer 1540 may be electrically connected with a conductive plate included in the first antenna 1510. The signal distributor 1540 may be a multiplexer, and may be, for example, a triplexer.

According to an embodiment, the signal distributor 1540 may include one or more filters. For example, the signal distributor 1540 may include a first filter corresponding to the first frequency band and a second filter corresponding to the second frequency band. For example, the first filter may be a band pass filter passing a signal in the first frequency band, and the second filter may be a band pass filter passing a signal in the second frequency band. The signal distributer 1540 may be configured to transmit a signal in the first frequency band to the first communication circuit 1550 and to transmit a signal in the second frequency band to the second communication circuit 1570. For example, the signal distributor 1540 may include three filters. The signal distributer 1540 may transmit a GPS signal of signals received by the first antenna 1510 to a surface acoustic wave (SAW) filter 1551. The signal distributer 1540 may transmit a mid-band signal to an MB LFEM (LNA/FEMiD) 1552. The signal distributer 1540 may transmit a high-band signal to the second communication circuit 1570.

According to an embodiment, the first communication circuit 1550 may be electrically connected with the signal distributer 1540 and may process a signal in the first frequency band. The first communication circuit 1550 may include, for example, the SAW filter 1551 and the MB LFEM 1552. For example, the SAW filter 1551 may receive a GPS signal from the signal distributer 1540, may filter a portion of the GPS signal, and may transmit a result of the filtering to the transceiver 1560. The MB LFEM 1552 may be a circuit including a low-noise amplifier (LNA) and front end module with integrated duplexers (FEMiD). For example, the MB LFEM 1552 may receive a mid-band signal from the signal distributer 1540, may amplify or separate the received signal, and may transmit a result of the amplifying or separating to the transceiver 1560.

According to an embodiment, the transceiver 1560 may be electrically connected with the SAW filter 1551 and the MB LFEM 1552. The transceiver 1560 may be electrically connected with the processor 1590.

According to an embodiment, the second communication circuit 1570 may be electrically connected with the signal distributer 1540 and may process a signal in the second frequency band. The second communication circuit 1570 may include, for example, a Wi-Fi communication circuit. The second communication circuit 1570 may receive a signal in the second frequency band from the signal distributer 1540. The second communication circuit 1570 may receive a signal in the second frequency band from the second antenna 1520 and the third antenna 1530. The second communication circuit 1570 may process a signal in the second frequency band and may transmit the processed signal to the processor 1590.

Figure 16:
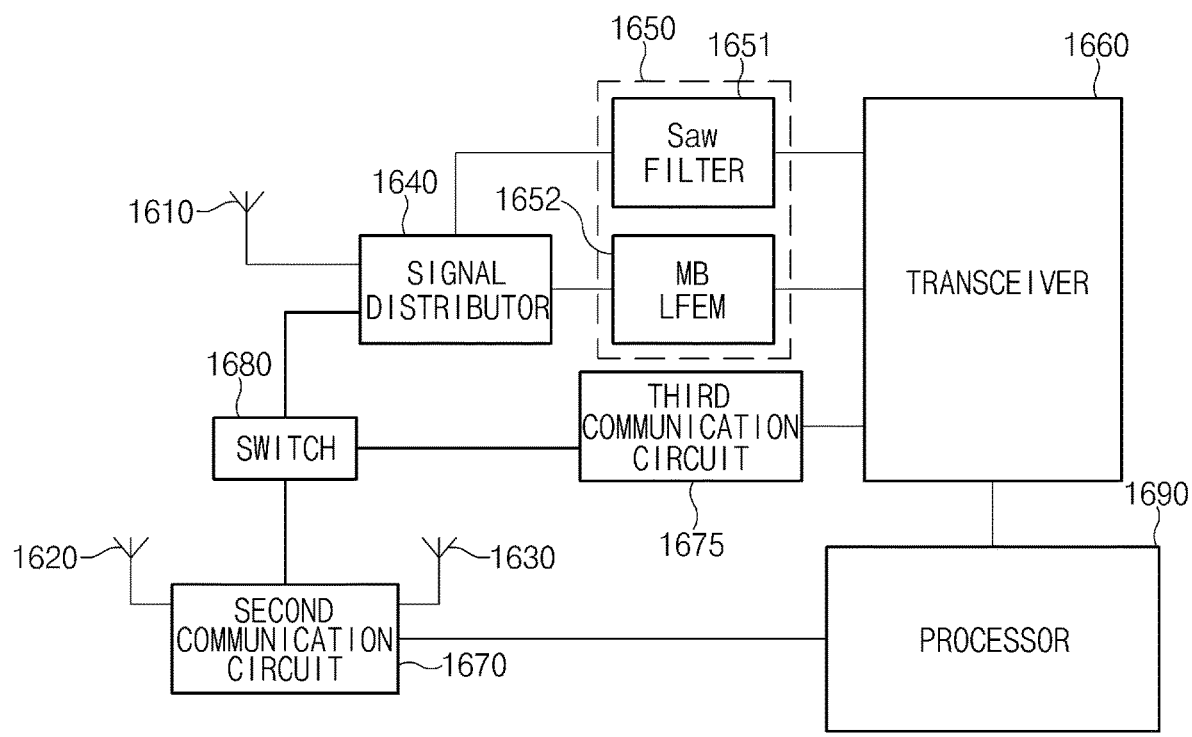
FIG. 16 is a block diagram illustrating a configuration of an electronic device according to an embodiment.

According to an embodiment, the processor 1590 may be electrically connected with the first communication circuit 1550 and the second communication circuit 1570. The processor 1590 may be, for example, a communication processor (CP). The processor 1590 may control the first communication circuit 1550 and the second communication circuit 1570. The processor 1590 may process signals received from the first communication circuit 1550 and the second communication circuit 1570. FIG. 16 is a block diagram illustrating a configuration of an electronic device according to an embodiment.

Referring to FIG. 16, an electronic device according to an embodiment may include a first antenna 1610, a second antenna 1620, a third antenna 1630, a signal distributer 1640, a first communication circuit 1650, a transceiver 1660, a second communication circuit 1670, a third communication circuit 1675, a switch 1680, and/or a processor 1690. The first antenna 1610, the second antenna 1620, the third antenna 1630, the signal distributer 1640, the first communication circuit 1650, the transceiver 1660, and the second communication circuit 1670 illustrated in FIG. 16 may be implemented to be similar to the first antenna 1510, the second antenna 1520, the third antenna 1530, the signal distributer 1540, the first communication circuit 1550, the transceiver 1560, and the second communication circuit 1570 illustrated in FIG. 15, and thus, additional description associated with the first antenna 1610, the second antenna 1620, the third antenna 1630, the signal distributer 1640, the first communication circuit 1650, the transceiver 1660, and the second communication circuit 1670 will be omitted to avoid redundancy.

According to an embodiment, the signal distributer 1640 may be a multiplexer configured to transmit a signal in the first frequency band to the first communication circuit 1650 and to transmit a signal in the second frequency band to the switch 1680. For example, the signal distributor 1640 may include a triplexer. The signal distributer 1640 may transmit a GPS signal of signals received by the first antenna 1610 to a SAW filter 1651. The signal distributer 1640 may transmit a mid-band signal to an MB LFEM 1652. The signal distributer 1640 may transmit a high-band signal to the switch 1680.

According to an embodiment, the second communication circuit 1670 may be electrically connected with the switch 1680. The second communication circuit 1670 may process a signal corresponding to a first communication scheme among signals in the second frequency band. For example, the first communication scheme may be a Wi-Fi communication scheme, and the second communication circuit 1670 may be a Wi-Fi communication circuit.

According to an embodiment, the third communication circuit 1675 may be electrically connected with the switch 1680. The third communication circuit 1675 may process a signal corresponding to a second communication scheme among signals in the second frequency band. For example, the second communication scheme may be an LAA or LTE-U communication scheme, and the third communication circuit 1675 may be an LAA or LTE-U communication circuit. The third communication circuit 1675 may include an LNA. The third communication circuit 1675 may amplify a signal of the second communication scheme and may transmit the amplified signal to the transceiver 1660.

According to an embodiment, the switch 1680 may be electrically connected with the signal distributer 1640, the second communication circuit 1670, and the third communication circuit 1675. The switch 1680 may selectively connect the signal distributer 1640 with the second communication circuit 1670 or the third communication circuit 1675. The switch 1680 may be implemented with, for example, a single pole double throw (SPDT) switch 1680. An operation of the switch 1680 may be controlled by the processor 1690.

According to an embodiment, the processor 1690 may be, for example, a communication processor (CP). The processor 1690 may be electrically connected with the first communication circuit 1650, the second communication circuit 1670, and/or the third communication circuit 1675. The processor 1690 may control the first communication circuit 1650, the second communication circuit 1670, the third communication circuit 1675, and/or the switch 1680 directly or through the transceiver 1660.

According to an embodiment, while the electronic device communicates in the first communication scheme, the processor 1690 may control the switch 1680 such that the signal distributer 1640 and the second communication circuit 1670 are electrically connected; while the electronic device communicates in the second communication scheme, the processor 1690 may control the switch 1680 such that the signal distributer 1640 and the third communication circuit 1675 are electrically connected.

According to an embodiment, when the electronic device communicates in the second communication scheme by using the second antenna 1620 or the third antenna 1630, the processor 1690 may control the switch 1680 such that the second communication circuit 1670 and the third communication circuit 1765 are electrically connected. In this case, the second communication circuit 1670 may include an electrical path which allows a signal received by the second antenna 1620 or the third antenna 1630 to be bypassed to the switch 1680.

According to an embodiment, the processor 1690 may recognize a type of communication which is performed in the electronic device. For example, while Wi-Fi communication is performed in the electronic device, the processor 1690 may control the switch 1680 such that the signal distributer 1640 and the second communication circuit 1670 are electrically connected. When the signal distributer 1640 and the second communication circuit 1670 are connected, the second communication circuit 1670 may process a Wi-Fi communication signal. For another example, while LAA or LTE-U communication is performed in the electronic device, the processor 1690 may control the switch 1680 such that the signal distributer 1640 and the third communication circuit 1675 are electrically connected. When the signal distributer 1640 and the third communication circuit 1675 are connected, the third communication circuit 1675 may process a LAA or LTE-U communication signal. Communication signals of different types using a signal in the same band may be processed by adopting the signal distributer 1640 and the switch 1680 connected with two or more communication circuits.

FIG. 17A and FIG. 17B are graphs illustrating a radiation efficiency of an antenna included in an electronic device for each frequency, according to an embodiment. (a) of FIG. 17 indicates a total radiation efficiency of an antenna included in an electronic device for each frequency, according to a comparative example. (b) of FIG. 17 indicates a total radiation efficiency of an antenna included in an electronic device for each frequency, according to an embodiment. Each of curves illustrated in (a) and (b) of FIG. 17 indicates a total radiation efficiency for each frequency repeatedly measured during tuning for the second frequency band (e.g., 5 GHZ or higher).

The electronic device according to an embodiment is the electronic device described with reference to FIG. 5, and the electronic device according to the comparative example is an electronic device which does not at least include the filter circuit 540 and the conductive member 550 illustrated in FIG. 5.

Referring to (a) of FIG. 17, the total radiation efficiency of the antenna included in the electronic device changes relatively much by the tuning for the second frequency band. For example, upon tuning for the second frequency band, an efficiency of an antenna may decrease in the first frequency band (e.g., 0.7 GHZ to 2.9 GHz). Accordingly, it may be difficult to implement one antenna supporting the first frequency band and the second frequency band.

Referring to (b) of FIG. 17, the total radiation efficiency of the antenna included in the electronic device changes relatively small by the tuning for the second frequency band. That is, upon tuning for the second frequency band, an efficiency of an antenna may be maintained in the first frequency band. The tuning for the second frequency band may be performed by tuning the filter circuit 540 and/or the conductive member 550 of FIG. 5. Accordingly, one antenna supporting the first frequency band and the second frequency band may be implemented.

Figure 18:
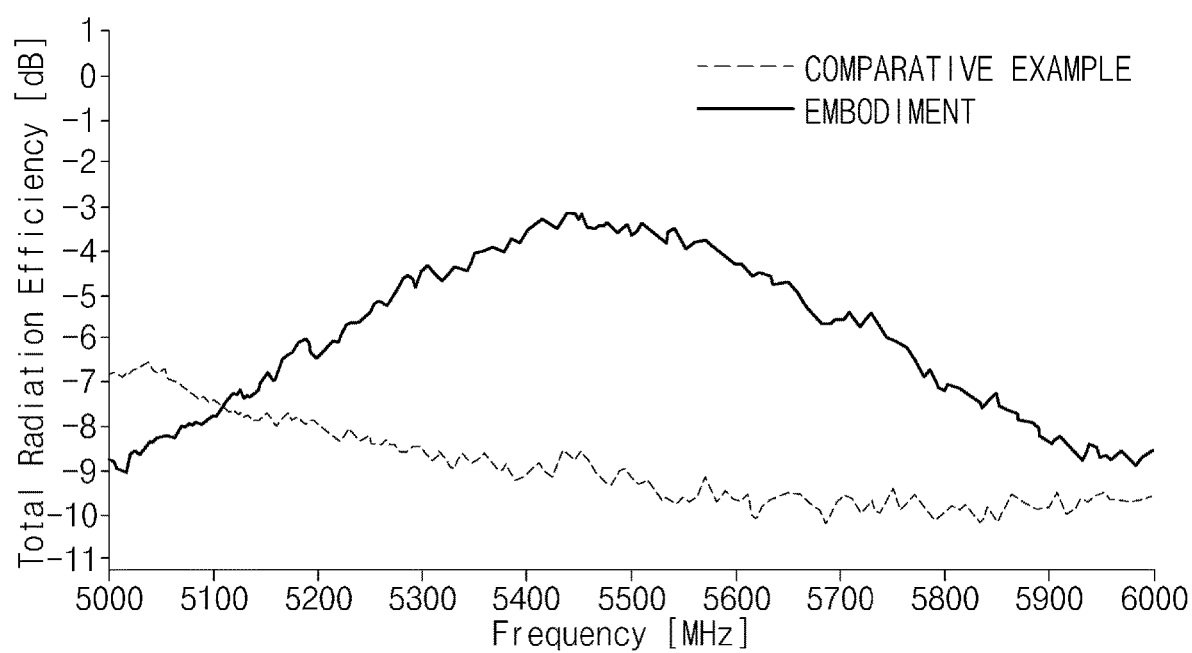
FIG. 18 is a graph illustrating a radiation efficiency of an antenna included in an electronic device for each frequency, according to an embodiment.

FIG. 18 is a graph illustrating a radiation efficiency of an antenna included in an electronic device for each frequency, according to an embodiment.

Referring to FIG. 18, an embodiment may be an electronic device in which the filter circuit 540 and the conductive member 550 illustrated in FIG. 5 are included, and a comparative example may be an electronic device which does not at least include the filter circuit 540 and the conductive member 550 illustrated in FIG. 5.

Referring to FIG. 18, in a 5.2 GHz to 5.8 GHz band, a total radiation efficiency of an antenna according to the embodiment is observed to be higher than a total radiation efficiency of an antenna according to the comparative example. The electronic device according to an embodiment may tune a resonant frequency of the 5 GHz band by adjusting an electrical length of a radiator by using the filter circuit 540 and/or the conductive member 550 of FIG. 5, and thus, an efficiency of an antenna in the corresponding band may be improved. As illustrated in FIG. 19, an efficiency of an antenna in a low band may be maintained even though the filter circuit 540 and/or the conductive member 550 are tuned to improve an efficiency of an antenna in a high band.

Figure 19A:
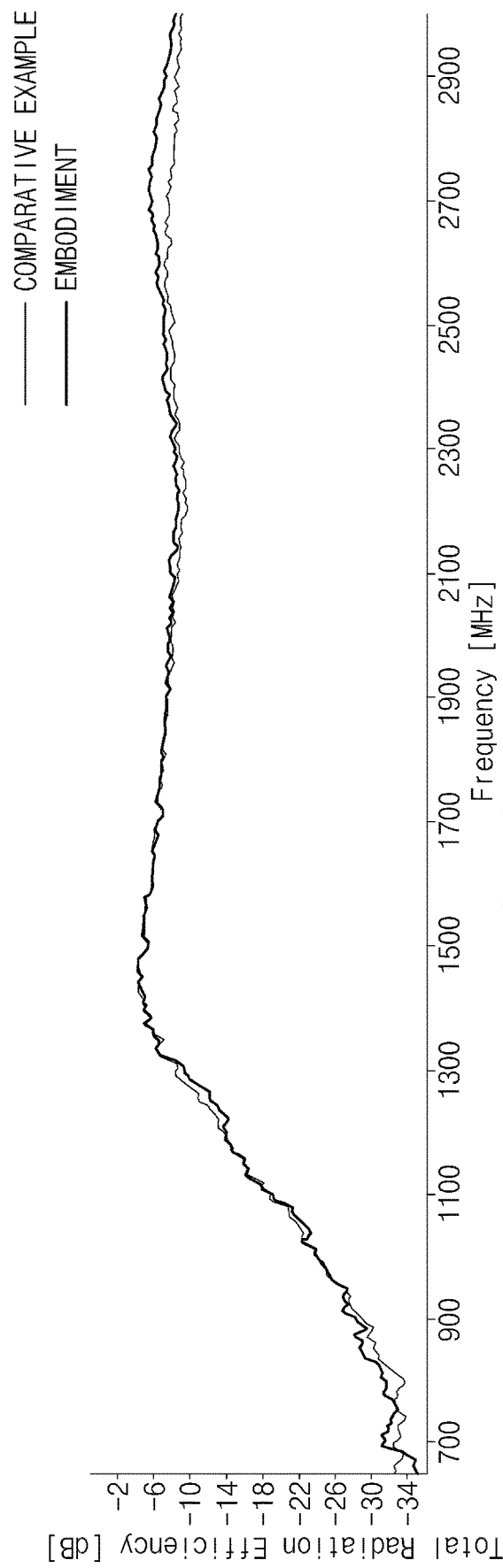
FIG. 19A and FIG. 19B is a graph illustrating a radiation efficiency and a reflection coefficient of an antenna included in an electronic device for each frequency, according to an embodiment.
Figure 19B:
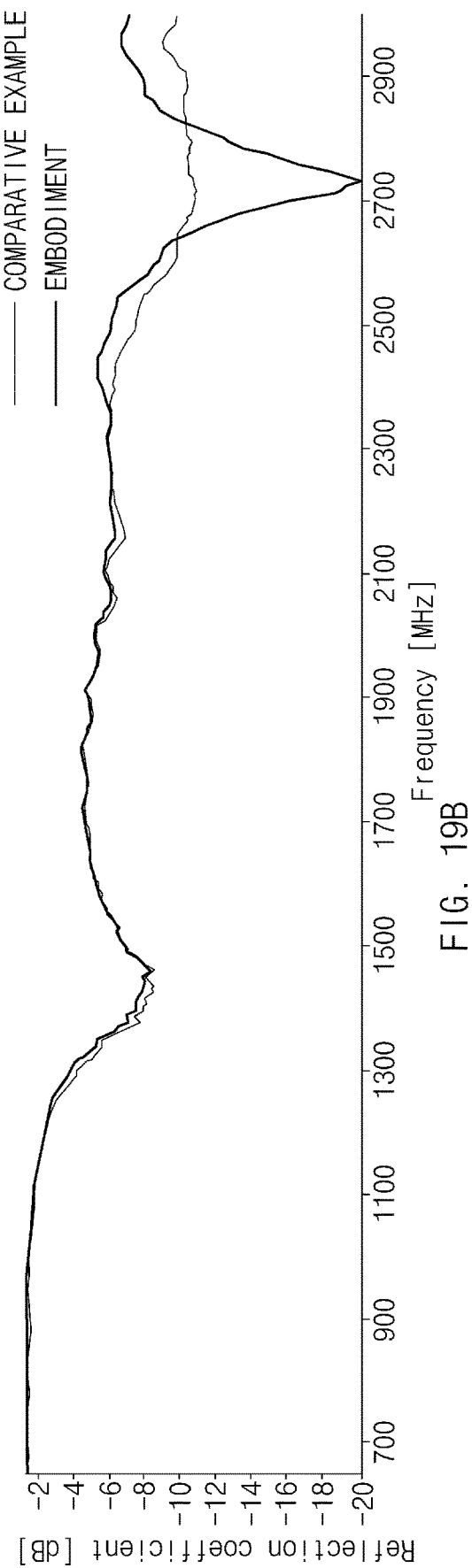

FIG. 19A and FIG. 19B are graphs illustrating a radiation efficiency and a reflection coefficient of an antenna included in an electronic device for each frequency, according to an embodiment.

(a) of FIG. 19 indicates a total radiation efficiency of an antenna included in an electronic device according to a comparative example and a total radiation efficiency of an antenna included in an electronic device according to an embodiment, for each frequency. (b) of FIG. 19 indicates a reflection coefficient of the antenna included in the electronic device according to the comparative example and a reflection coefficient of the antenna included in the electronic device according to the embodiment, for each frequency.

The electronic device according to the embodiment is the electronic device described with reference to FIG. 5, and the electronic device according to the comparative example is an electronic device which does not at least include the filter circuit 540 and the conductive member 550 illustrated in FIG. 5.

Referring to (a) of FIG. 19, in a 2.7 GHz band, the total radiation efficiency of the antenna included in the electronic device according to the embodiment is observed to be higher than the total radiation efficiency of the antenna included in the electronic device according to the comparative example.

Referring to (b) of FIG. 19, in the 2.7 GHZ band, the reflection coefficient of the electronic device according to the embodiment is observed to be lower than the reflection coefficient of the electronic device according to the comparative example.

As illustrated in (a) and (b) of FIG. 19, the electronic device according to the embodiment may have excellent performance in the 2.7 GHz band as well as in the 5 GHz band.

Figure 20:
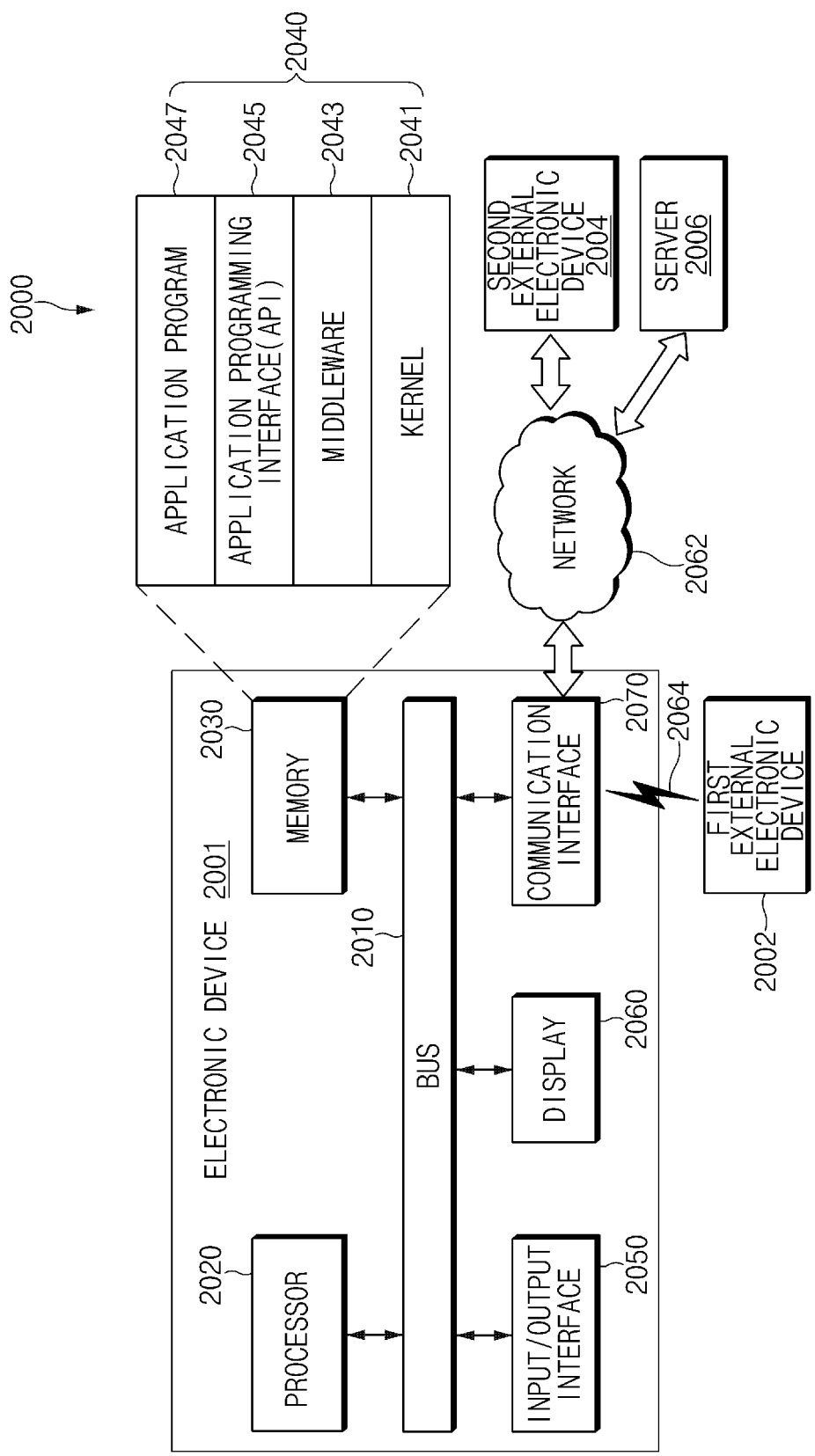
FIG. 20 illustrates an electronic device in a network environment according to an embodiment.

FIG. 20 illustrates an electronic device in a network environment system, according to an embodiment.

Referring to FIG. 20, according to various embodiments, an electronic device 2001, a first electronic device 2002, a second electronic device 2004, or a server 2006 may be connected each other over a network 2062 or a short range communication 2064. The electronic device 2001 may include a bus 2010, a processor 2020, a memory 2030, an input/output interface 2050, a display 2060, and a communication interface 2070. According to an embodiment, the electronic device 2001 may not include at least one of the above-described components or may further include other component(s).

For example, the bus 2010 may interconnect the above-described components 2010 to 2070 and may include a circuit for conveying communications (e.g., a control message and/or data) among the above-described components.

The processor 2020 may include one or more of a central processing unit (CPU), an application processor (AP), or a communication processor (CP). For example, the processor 2020 may perform an arithmetic operation or data processing associated with control and/or communication of at least other components of the electronic device 2001.

The memory 2030 may include a volatile and/or nonvolatile memory. For example, the memory 2030 may store commands or data associated with at least one other component(s) of the electronic device 2001. According to an embodiment, the memory 2030 may store software and/or a program 2040. The program 2040 may include, for example, a kernel 2041, a middleware 2043, an application programming interface (API) 2045, and/or an application program (or "an application") 2047. At least a part of the kernel 2041, the middleware 2043, or the API 2045 may be referred to as an "operating system (OS)".

For example, the kernel 2041 may control or manage system resources (e.g., the bus 2010, the processor 2020, the memory 2030, and the like) that are used to execute operations or functions of other programs (e.g., the middleware 2043, the API 2045, and the application program 2047). Furthermore, the kernel 2041 may provide an interface that allows the middleware 2043, the API 2045, or the application program 2047 to access discrete components of the electronic device 2001 so as to control or manage system resources.

The middleware 2043 may perform, for example, a mediation role such that the API 2045 or the application program 2047 communicates with the kernel 2041 to exchange data.

Furthermore, the middleware 2043 may process task requests received from the application program 2047 according to a priority. For example, the middleware 2043 may assign the priority, which makes it possible to use a system resource (e.g., the bus 2010, the processor 2020, the memory 2030, or the like) of the electronic device 2001, to at least one of the application program 2047. For example, the middleware 2043 may process the one or more task requests according to the priority assigned to the at least one, which makes it possible to perform scheduling or load balancing on the one or more task requests.

The API 2045 may be, for example, an interface through which the application program 2047 controls a function provided by the kernel 2041 or the middleware 2043, and may include, for example, at least one interface or function (e.g., an instruction) for a file control, a window control, image processing, a character control, or the like.

The input/output interface 2050 may play a role, for example, of an interface which transmits a command or data input from a user or another external device, to other component(s) of the electronic device 2001. Furthermore, the input/output interface 2050 may output a command or data, received from other component(s) of the electronic device 2001, to a user or another external device.

The display 2060 may include, for example, a liquid crystal display (LCD), a light-emitting diode (LED) display, an organic LED (OLED) display, a microelectromechanical systems (MEMS) display, or an electronic paper display. The display 2060 may display, for example, various contents (e.g., a text, an image, a video, an icon, a symbol, and the like) to a user. The display 2060 may include a touch screen and may receive, for example, a touch, gesture, proximity, or hovering input using an electronic pen or a part of a user's body.

For example, the communication interface 2070 may establish communication between the electronic device 2001 and an external device (e.g., the first electronic device 2002, the second electronic device 2004, or the server 2006). For example, the communication interface 2070 may be connected to the network 2062 over wireless communication or wired communication to communicate with the external device (e.g., the second electronic device 2004 or the server 2006).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 2064. The short range communication 2064 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 2001 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 2062 may include at least one of telecommunications networks, for example, a computer network (e.g., LAN or WAN), an Internet, or a telephone network.

Each of the first and second electronic devices 2002 and 2004 may be a device of which the type is different from or the same as that of the electronic device 2001. According to an embodiment, the server 2006 may include a group of one or more servers. According to various embodiments, all or a portion of operations that the electronic device 2001 will perform may be executed by another or plural electronic devices (e.g., the first electronic device 2002, the second electronic device 2004 or the server 2006). According to an embodiment, in the case where the electronic device 2001 executes any function or service automatically or in response to a request, the electronic device 2001 may not perform the function or the service internally, but, alternatively additionally, it may request at least a portion of a function associated with the electronic device 2001 from another device (e.g., the electronic device 2002 or 2004 or the server 2006). The other electronic device may execute the requested function or additional function and may transmit the execution result to the electronic device 2001. The electronic device 2001 may provide the requested function or service using the received result or may additionally process the received result to provide the requested function or service. To this end, for example, cloud computing, distributed computing, or client-server computing may be used.

Figure 21:
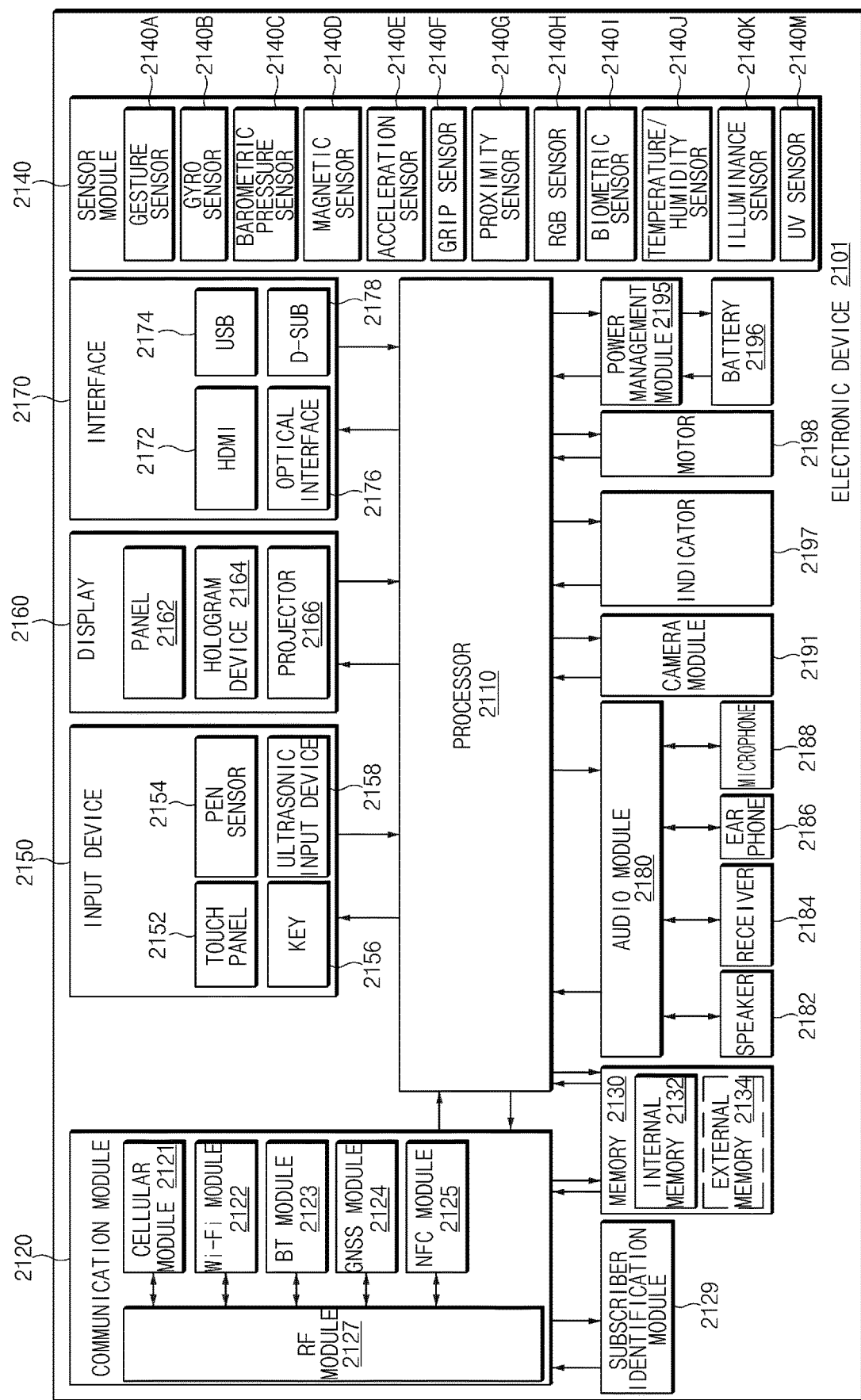
FIG. 21 illustrates a block diagram of an electronic device according to an embodiment.

FIG. 21 illustrates a block diagram of an electronic device, according to an embodiment.

Referring to FIG. 21, an electronic device 2101 may include, for example, all or a part of the electronic device 2001 illustrated in FIG. 20. The electronic device 2101 may include one or more processors (e.g., an application processor (AP)) 2110, a communication module 2120, a subscriber identification module 2129, a memory 2130, a sensor module 2140, an input device 2150, a display 2160, an interface 2170, an audio module 2180, a camera module 2191, a power management module 2195, a battery 2196, an indicator 2197, and a motor 2198.

The processor 2110 may drive, for example, an operating system (OS) or an application to control a plurality of hardware or software components connected to the processor 2110 and may process and compute a variety of data. For example, the processor 2110 may be implemented with a System on Chip (SoC). According to an embodiment, the processor 2110 may further include a graphic processing unit (GPU) and/or an image signal processor. The processor 2110 may include at least a part (e.g., a cellular module 2121) of components illustrated in FIG. 21. The processor 2110 may load a command or data, which is received from at least one of other components (e.g., a nonvolatile memory), into a volatile memory and process the loaded command or data. The processor 2110 may store a variety of data in the nonvolatile memory.

The communication module 2120 may be configured the same as or similar to the communication interface 2070 of FIG. 20. The communication module 2120 may include the cellular module 2121, a Wi-Fi module 2122, a Bluetooth (BT) module 2123, a GNSS module 2124 (e.g., a GPS module, a Glonass module, a Beidou module, or a Galileo module), a near field communication (NFC) module 2125, and a radio frequency (RF) module 2127.

The cellular module 2121 may provide, for example, voice communication, video communication, a character service, an Internet service, or the like over a communication network. According to an embodiment, the cellular module 2121 may perform discrimination and authentication of the electronic device 2101 within a communication network by using the subscriber identification module (e.g., a SIM card) 2129. According to an embodiment, the cellular module 2121 may perform at least a portion of functions that the processor 2110 provides. According to an embodiment, the cellular module 2121 may include a communication processor (CP).

Each of the Wi-Fi module 2122, the BT module 2123, the GNSS module 2124, or the NFC module 2125 may include a processor for processing data exchanged through a corresponding module, for example. According to an embodiment, at least a part (e.g., two or more) of the cellular module 2121, the Wi-Fi module 2122, the BT module 2123, the GNSS module 2124, or the NFC module 2125 may be included within one Integrated Circuit (IC) or an IC package.

For example, the RF module 2127 may transmit and receive a communication signal (e.g., an RF signal). For example, the RF module 2127 may include a transceiver, a power amplifier module (PAM), a frequency filter, a low noise amplifier (LNA), an antenna, or the like. According to another embodiment, at least one of the cellular module 2121, the Wi-Fi module 2122, the BT module 2123, the GNSS module 2124, or the NFC module 2125 may transmit and receive an RF signal through a separate RF module.

The subscriber identification module 2129 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 2130 (e.g., the memory 2030) may include an internal memory 2132 or an external memory 2134. For example, the internal memory 2132 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 2134 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 2134 may be operatively and/or physically connected to the electronic device 2101 through various interfaces.

The sensor module 2140 may measure, for example, a physical quantity or may detect an operation state of the electronic device 2101. The sensor module 2140 may convert the measured or detected information to an electric signal. For example, the sensor module 2140 may include at least one of a gesture sensor 2140A, a gyro sensor 2140B, a barometric pressure sensor 2140C, a magnetic sensor 2140D, an acceleration sensor 2140E, a grip sensor 2140F, the proximity sensor 2140G, a color sensor 2140H (e.g., red, green, blue (RGB) sensor), a biometric sensor 2140I, a temperature/humidity sensor 2140J, an illuminance sensor 2140K, or an UV sensor 2140M. Although not illustrated, additionally or alternatively, the sensor module 2140 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2140 may further include a control circuit for controlling at least one or more sensors included therein. According to an embodiment, the electronic device 2101 may further include a processor that is a part of the processor 2110 or independent of the processor 2110 and is configured to control the sensor module 2140. The processor may control the sensor module 2140 while the processor 2110 remains at a sleep state.

The input device 2150 may include, for example, a touch panel 2152, a (digital) pen sensor 2154, a key 2156, or an ultrasonic input unit 2158. For example, the touch panel 2152 may use at least one of capacitive, resistive, infrared and ultrasonic detecting methods. Also, the touch panel 2152 may further include a control circuit. The touch panel 2152 may further include a tactile layer to provide a tactile reaction to a user.

The (digital) pen sensor 2154 may be, for example, a part of a touch panel or may include an additional sheet for recognition. The key 2156 may include, for example, a physical button, an optical key, a keypad, or the like. The ultrasonic input device 2158 may detect (or sense) an ultrasonic signal, which is generated from an input device, through a microphone (e.g., a microphone 2188) and may check data corresponding to the detected ultrasonic signal.

The display 2160 (e.g., the display 2060) may include a panel 2162, a hologram device 2164, or a projector 2166. The panel 2162 may be the same as or similar to the display 2060 illustrated in FIG. 20. The panel 2162 may be implemented, for example, to be flexible, transparent or wearable. The panel 2162 and the touch panel 2152 may be integrated into a single module. The hologram device 2164 may display a stereoscopic image in a space using a light interference phenomenon. The projector 2166 may project light onto a screen so as to display an image. For example, the screen may be arranged in the inside or the outside of the electronic device 2101. According to an embodiment, the display 2160 may further include a control circuit for controlling the panel 2162, the hologram device 2164, or the projector 2166.

The interface 2170 may include, for example, a high-definition multimedia interface (HDMI) 2172, a universal serial bus (USB) 2174, an optical interface 2176, or a D-subminiature (D-sub) 2178. The interface 2170 may be included, for example, in the communication interface 2070 illustrated in FIG. 20. Additionally or alternatively, the interface 2170 may include, for example, a mobile high definition link (MHL) interface, a SD card/multi-media card (MMC) interface, or an infrared data association (IrDA) standard interface.

The audio module 2180 may convert a sound and an electric signal in dual directions. At least a component of the audio module 2180 may be included, for example, in the input/output interface 2050 illustrated in FIG. 20. The audio module 2180 may process, for example, sound information that is input or output through a speaker 2182, a receiver 2184, an earphone 2186, or the microphone 2188.

For example, the camera module 2191 may shoot a still image or a video. According to an embodiment, the camera module 2191 may include at least one or more image sensors (e.g., a front sensor or a rear sensor), a lens, an image signal processor (ISP), or a flash (e.g., an LED or a xenon lamp).

The power management module 2195 may manage, for example, power of the electronic device 2101. According to an embodiment, a power management integrated circuit (PMIC), a charger IC, or a battery or fuel gauge may be included in the power management module 2195. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 2196 and a voltage, current or temperature thereof while the battery is charged. The battery 2196 may include, for example, a rechargeable battery and/or a solar battery.

The indicator 2197 may display a specific state of the electronic device 2101 or a part thereof (e.g., the processor 2110), such as a booting state, a message state, a charging state, and the like. The motor 2198 may convert an electrical signal into a mechanical vibration and may generate the following effects: vibration, haptic, and the like. Although not illustrated, a processing device (e.g., a GPU) for supporting a mobile TV may be included in the electronic device 2101. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 22:
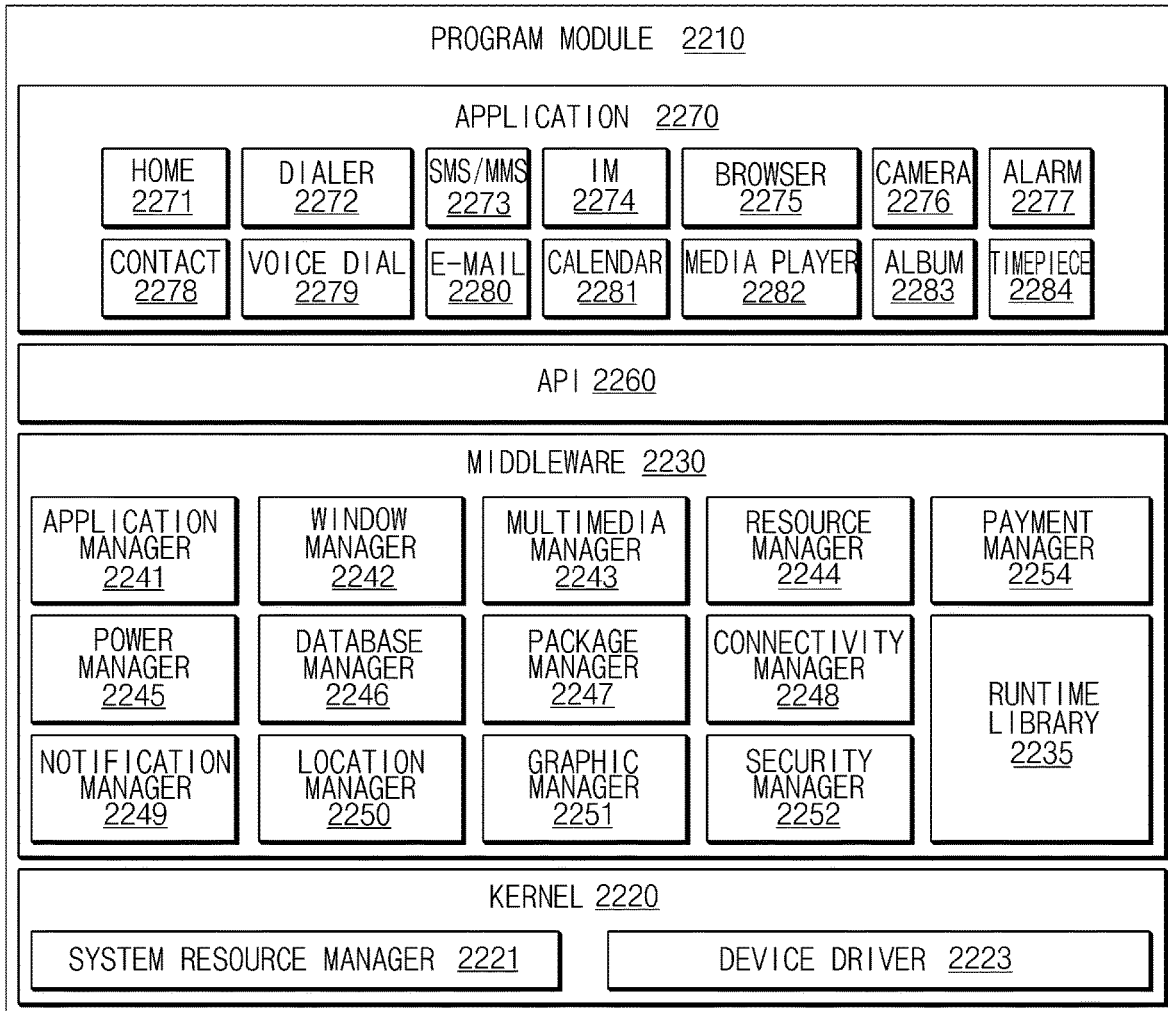
FIG. 22 is a block diagram of a program module according to an embodiment.

FIG. 22 illustrates a block diagram of a program module, according to various embodiments.

According to an embodiment, a program module 2210 (e.g., the program 2040) may include an operating system (OS) to control resources associated with an electronic device (e.g., the electronic device 2001), and/or diverse applications (e.g., the application program 2047) driven on the OS. The OS may be, for example, Android™, iOS™, Windows™, Symbian™, or Tizen™.

The program module 2210 may include a kernel 2220, a middleware 2230, an application programming interface (API) 2260, and/or an application 2270. At least a portion of the program module 2210 may be preloaded on an electronic device or may be downloadable from an external electronic device (e.g., the first electronic device 2002, the second electronic device 2004, the server 2006, or the like).

The kernel 2220 (e.g., the kernel 2041) may include, for example, a system resource manager 2221 or a device driver 2223. The system resource manager 2221 may perform control, allocation, or retrieval of system resources. According to an embodiment, the system resource manager 2221 may include a process managing unit, a memory managing unit, or a file system managing unit. The device driver 2223 may include, for example, a display driver, a camera driver, a Bluetooth driver, a shared memory driver, a USB driver, a keypad driver, a Wi-Fi driver, an audio driver, or an inter-process communication (IPC) driver.

The middleware 2230 may provide, for example, a function that the application 2270 needs in common, or may provide diverse functions to the application 2270 through the API 2260 to allow the application 2270 to efficiently use limited system resources of the electronic device. According to an embodiment, the middleware 2230 (e.g., the middleware 2043) may include at least one of a runtime library 2235, an application manager 2241, a window manager 2242, a multimedia manager 2243, a resource manager 2244, a power manager 2245, a database manager 2246, a package manager 2247, a connectivity manager 2248, a notification manager 2249, a location manager 2250, a graphic manager 2251, or a security manager 2252.

The runtime library 2235 may include, for example, a library module that is used by a compiler to add a new function through a programming language while the application 2270 is being executed. The runtime library 2235 may perform input/output management, memory management, or capacities about arithmetic functions.

The application manager 2241 may manage, for example, a life cycle of at least one application of the application 2270. The window manager 2242 may manage a graphic user interface (GUI) resource that is used in a screen. The multimedia manager 2243 may identify a format necessary for playing diverse media files, and may perform encoding or decoding of media files by using a codec suitable for the format. The resource manager 2244 may manage resources such as a storage space, memory, or source code of at least one application of the application 2270.

The power manager 2245 may operate, for example, with a basic input/output system (BIOS) to manage a battery or power, and may provide power information for an operation of an electronic device. The database manager 2246 may generate, search for, or modify database that is to be used in at least one application of the application 2270. The package manager 2247 may install or update an application that is distributed in the form of package file.

The connectivity manager 2248 may manage, for example, wireless connection such as Wi-Fi or Bluetooth. The notification manager 2249 may display or notify an event such as arrival message, appointment, or proximity notification in a mode that does not disturb a user. The location manager 2250 may manage location information about an electronic device. The graphic manager 2251 may manage a graphic effect that is provided to a user, or manage a user interface relevant thereto. The security manager 2252 may provide a general security function necessary for system security, user authentication, or the like. According to an embodiment, in the case where an electronic device (e.g., the electronic device 2001) includes a telephony function, the middleware 2230 may further include a telephony manager for managing a voice or video call function of the electronic device.

The middleware 2230 may include a middleware module that combines diverse functions of the above-described components. The middleware 2230 may provide a module specialized to each OS kind to provide differentiated functions. Additionally, the middleware 2230 may dynamically remove a part of the preexisting components or may add new components thereto.

The API 2260 (e.g., the API 2045) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 2270 (e.g., the application program 2047) may include, for example, one or more applications capable of providing functions for a home 2271, a dialer 2272, an SMS/MMS 2273, an instant message (IM) 2274, a browser 2275, a camera 2276, an alarm 2277, a contact 2278, a voice dial 2279, an e-mail 2280, a calendar 2281, a media player 2282, an album 2283, and a timepiece 2284, or for offering health care (e.g., measuring an exercise quantity, blood sugar, or the like) or environment information (e.g., information of barometric pressure, humidity, temperature, or the like).

According to an embodiment, the application 2270 may include an application (hereinafter referred to as "information exchanging application" for descriptive convenience) to support information exchange between an electronic device (e.g., the electronic device 2001) and an external electronic device (e.g., the first electronic device 2002 or the second electronic device 2004). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 2270 may include an application (e.g., a health care application of a mobile medical device) that is assigned in accordance with an attribute of an external electronic device. According to an embodiment, the application 2270 may include an application that is received from an external electronic device (e.g., the first electronic device 2002, the second electronic device 2004, or the server 2006). According to an embodiment, the application 2270 may include a preloaded application or a third party application that is downloadable from a server. The names of components of the program module 2210 according to the embodiment may be modifiable depending on kinds of operating systems.

According to various embodiments, at least a portion of the program module 2210 may be implemented by software, firmware, hardware, or a combination of two or more thereof. At least a portion of the program module 2210 may be implemented (e.g., executed), for example, by the processor (e.g., the processor 2110). At least a portion of the program module 2210 may include, for example, modules, programs, routines, sets of instructions, processes, or the like for performing one or more functions.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 2020), may cause the one or more processors to perform a function corresponding to the instruction. The computer-readable storage media, for example, may be the memory 2030.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   an antenna element including a portion of a conductive outer frame of a housing of the electronic device, and configured to resonate in a first frequency band;
   a circuit board accommodated in the housing;
   a first conductive member disposed at a first layer of the circuit board and electrically connected with the antenna element, the first conductive member configured to resonate in the first frequency band or in a second frequency band higher than the first frequency band;
   a second conducive member disposed at a second layer of the circuit board as spaced apart from and substantially parallel with the first conductive member such that the second conductive member is electrically coupled with the first conductive member, the second conductive member configured to resonate in the first frequency band or in the second frequency band; and
   a third conductive member disposed in the circuit board as electrically connected with at least one of the first conductive member or the second conductive member, the third conductive member configured to resonate in the second frequency band.

2. The electronic circuit of claim 1, wherein the third conductive member includes a conductive pattern printed on the circuit board.

3. The electronic circuit of claim 1, further comprising:
   a connection member with which each of the antenna element and the first conductive member is in contact.

4. The electronic circuit of claim 1, further comprising:
   a filter circuit disposed between the second conductive member and the third conductive member, and having a pass band in the second frequency band.

5. The electronic circuit of claim 1, further comprising:
   a capacitor including one end electrically connected with the antenna element and an opposite end electrically connected with the first conductive member.

6. The electronic circuit of claim 3, further comprising:
   a matching circuit electrically connected with the antenna element through the connection member.

* * * * *